(12) United States Patent
Wada et al.

(10) Patent No.: US 11,283,984 B2
(45) Date of Patent: Mar. 22, 2022

(54) ACCESSORY APPARATUS, IMAGE-CAPTURING APPARATUS, CONTROL METHOD AND STORAGE MEDIUM STORING CONTROL PROGRAM

(71) Applicant: CANON KABUSHIKI KAISHA, Tokyo (JP)

(72) Inventors: Katsuhiro Wada, Tokyo (JP); Kazuhiro Namiki, Yokohama (JP); Nobuyuki Horie, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/552,574

(22) Filed: Aug. 27, 2019

(65) Prior Publication Data
US 2019/0387156 A1    Dec. 19, 2019

Related U.S. Application Data

(62) Division of application No. 15/468,240, filed on Mar. 24, 2017, now Pat. No. 10,674,064.

(30) Foreign Application Priority Data

Mar. 31, 2016 (JP) .................. 2016-073360

(51) Int. Cl.
*H04N 5/225* (2006.01)
*H04N 5/232* (2006.01)
*G03B 17/14* (2021.01)

(52) U.S. Cl.
CPC ......... *H04N 5/23209* (2013.01); *G03B 17/14* (2013.01)

(58) Field of Classification Search
CPC ............... H04N 5/232; H04N 5/23241; H04N 5/232411; H04N 5/23203; H04N 5/23206;
(Continued)

(56) References Cited

U.S. PATENT DOCUMENTS 5,157,431 A    10/1992   Mabuchi et al.
2002/0118972 A1   8/2002   Uenaka et al.
(Continued)

FOREIGN PATENT DOCUMENTS

CN    101674405 A    3/2010
CN    103069335 A    4/2013
(Continued)

OTHER PUBLICATIONS

The above foreign patent document was cited in the Feb. 4, 2020 Japanese Office Action, of which is enclosed with an English Translation, that issued in Japanese Patent Application No. 2016073360.
(Continued)

*Primary Examiner* — Kelly L Jerabek
(74) *Attorney, Agent, or Firm* — Cowan, Liebowitz & Latman, P.C.

(57) ABSTRACT

The accessory apparatus includes an accessory communicator providing a notification channel (RTS), a first data communication channel (DCL) and a second data communication channel (DCL). The accessory controller transmits, in a transmission request receiving state of receiving a transmission request from an image-capturing apparatus through the notification channel, accessory data to the image-capturing apparatus through the first data communication channel, and receives camera data transmitted through the second data communication channel from the image-capturing apparatus in response to receiving the accessory data. The accessory controller stops, in the transmission request receiving state and during transmission of the accessory data to the image-capturing apparatus, in response to becoming a non-transmission request receiving state, transmitting the accessory data to the image-capturing apparatus.

33 Claims, 16 Drawing Sheets

(58) Field of Classification Search
CPC .. H04N 5/23209; H04N 5/2254; G03B 17/12; G03B 17/14; G02B 7/14
See application file for complete search history.

(56) References Cited

U.S. PATENT DOCUMENTS

| | | | |
|---|---|---|---|
| 2007/0098385 A1 | 5/2007 | Tanaka et al. | |
| 2009/0295940 A1 | 12/2009 | Shibuno | |
| 2012/0033955 A1 | 2/2012 | Okada | |
| 2013/0004152 A1 | 1/2013 | Imafuji | |
| 2013/0141609 A1 | 6/2013 | Watazawa | |
| 2013/0308042 A1* | 11/2013 | Kawada | H04N 5/23209 348/360 |
| 2014/0184893 A1* | 7/2014 | Imafuji | H04N 5/232935 348/360 |
| 2016/0241773 A1 | 8/2016 | Shida et al. | |

FOREIGN PATENT DOCUMENTS

| | | |
|---|---|---|
| CN | 104272181 A | 1/2015 |
| CN | 105357439 A | 2/2016 |
| JP | 04-350611 A | 12/1992 |
| JP | 2851853 B2 | 1/1999 |
| JP | 2002-072328 A | 3/2002 |
| JP | 2003153064 A | 5/2003 |
| JP | 2010-054629 A | 3/2010 |
| JP | 2010-101962 A | 5/2010 |
| JP | 2010-237514 A | 10/2010 |
| JP | 2012053443 A | 3/2012 |
| JP | 2012108474 A | 6/2012 |
| JP | 2015-121638 A | 7/2015 |

OTHER PUBLICATIONS

The above foreign patent documents were cited in a Dec. 30, 2019 Chinese Office Action, of which is enclosed with an English Translation, that issued in Chinese Patent Application No. 201710207096.2.
The above documents were cited in a European Office Action dated Sep. 18, 2019, of which is enclosed, that issued in the corresponding European Patent Application No. 17163785.3.
"Flow Control (Data)—Wikipedia", https://en.wikipedia.org/w/index.php?title=Flow_control_(data)&oldid=712467948, pp. 1-6, Printed Sep. 11, 2019.
"Serial Port", https://en.wikipedia.org/w/index.php?title Serial_port &oldid =722694795, pp. 1-5, Printed Sep. 11, 2019.
The above U.S. Patent Publication documents #1-3 were cited in a European Search Report dated Oct. 6, 2017, of which is enclosed, that issued in the corresponding European Patent Application No. 17163785.3.
The above Non-Patent Literature documents #2-3 were cited in a European Office Action dated Sep. 18, 2019, of which is enclosed, that issued in the corresponding European Patent Application No. 17163785.3.
The documents below were cited in a European Search Report dated Jan. 21, 2021, of which is anclosed, that issued in the corresponding European Patent Application No. 20195913.7.
TMS320DM644x DMSoC Universal Asynchronous Receiver/Transmitter (UART), Texas Instruments, User's Guide-Literature No. SPRUE33A, Apr. 2008, 39 Pages.
Using the simple Serial Interface For Embedded Measurement Devices: 78M6610+LMU, 78M6610+PSU, and the MAX78630+ PPM, Maxim Integrated, 2014, pp. 1-7.
The above foreign patent documents were cited in the Feb. 1, 2022 Japanese Office Action, a copy of which is enclosed with an English Translation, that issued in Japanese Patent Application No. 2021-025697.

* cited by examiner

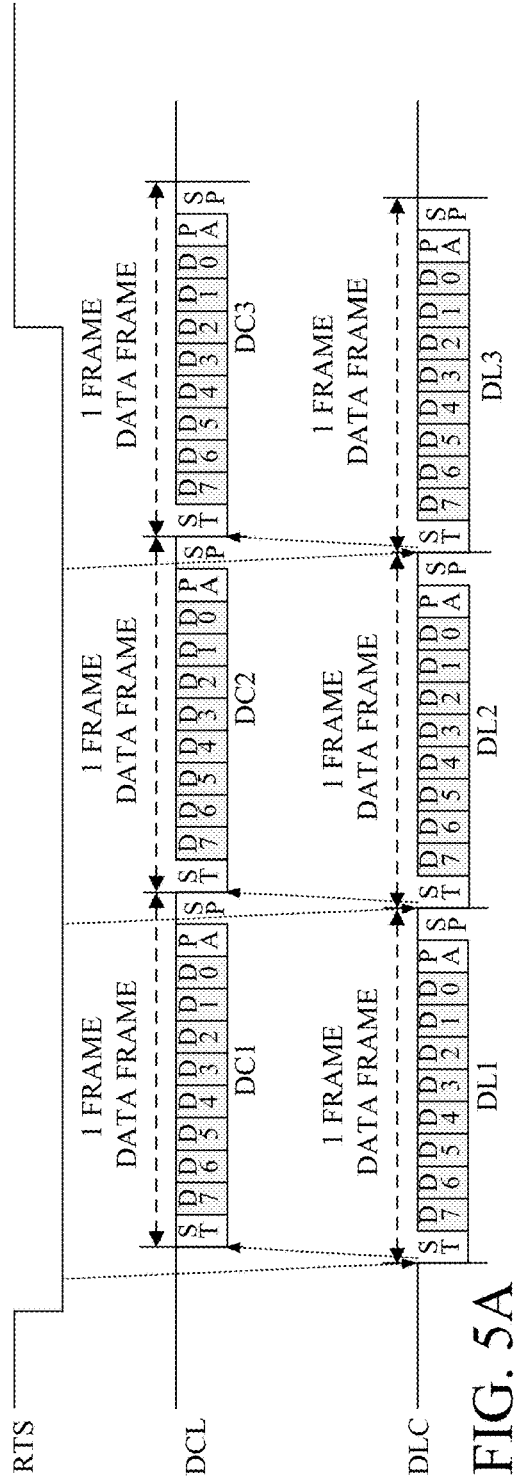
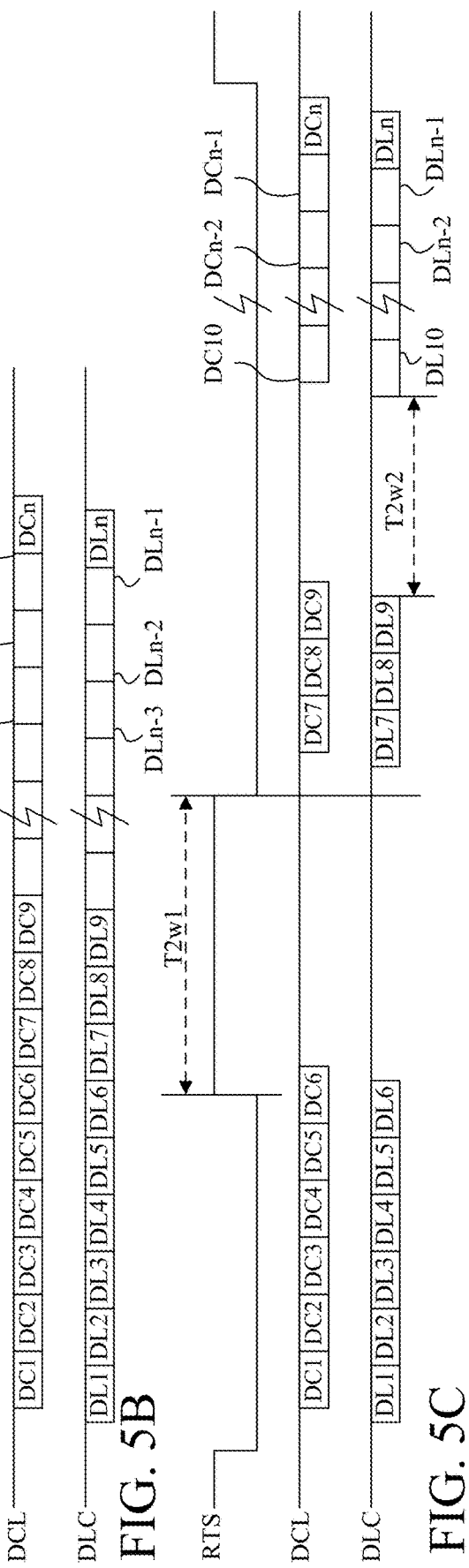
FIG. 5A
FIG. 5B
FIG. 5C

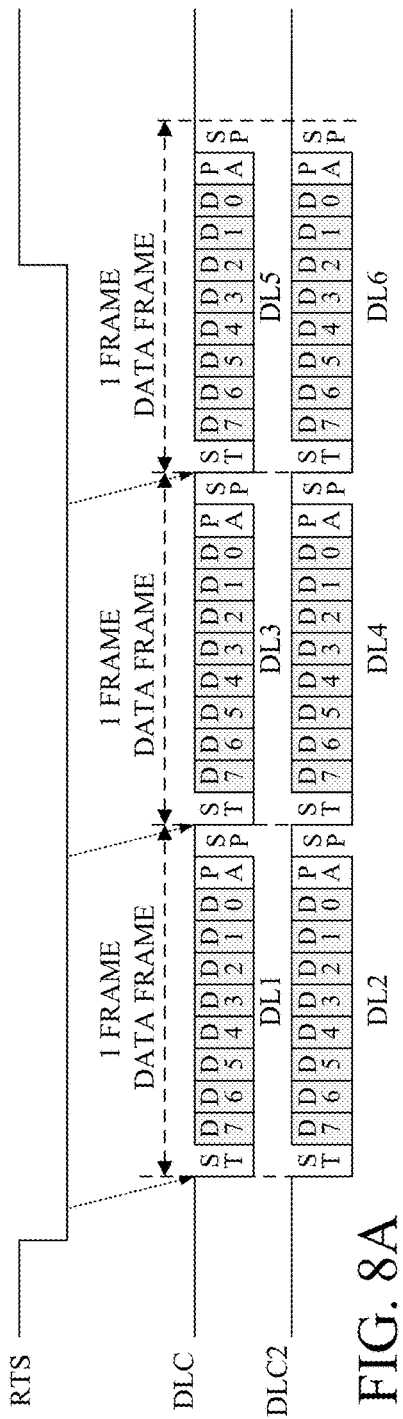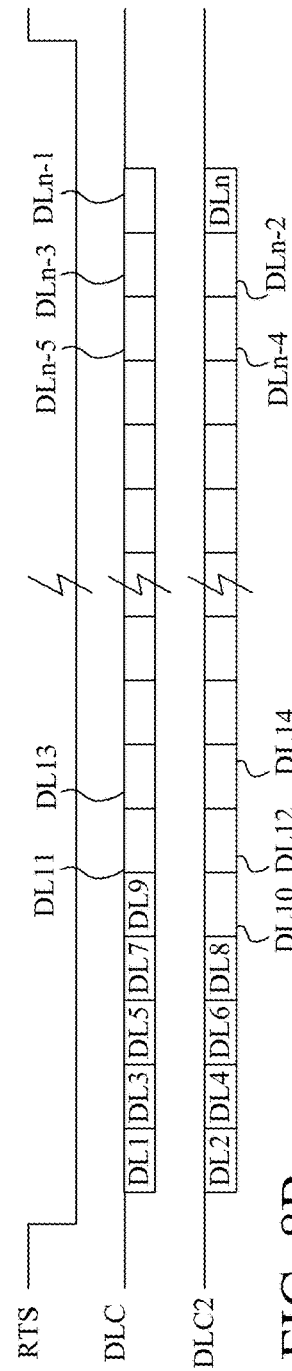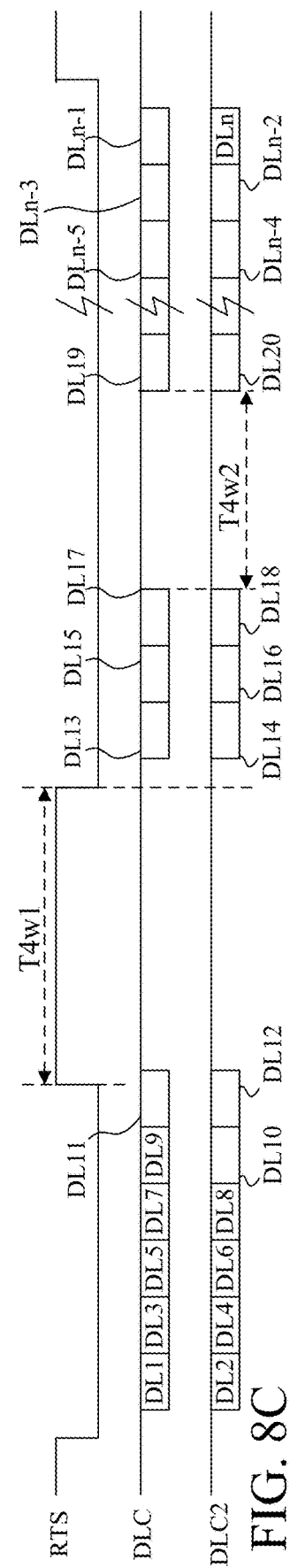

| BURST COMMUNICATION DATA AMOUNT | PREDETERMINED TIME A |
|---|---|
| LESS THAN Rx_RAM | A = 0ms |
| MORE THAN Rx_RAM | A = 20ms |

FIG. 13

ACCESSORY APPARATUS, IMAGE-CAPTURING APPARATUS, CONTROL METHOD AND STORAGE MEDIUM STORING CONTROL PROGRAM

CROSS-REFERENCE TO RELATED APPLICATION

This application is a divisional of application Ser. No. 15/468,240, filed Mar. 24, 2017, the entire disclosure of which is hereby incorporated by reference.

BACKGROUND OF THE INVENTION

Field of the Invention

The present invention relates to an image-capturing apparatus (hereinafter referred to as "a camera body") and an accessory apparatus such as an interchangeable lens communicable with each other.

Description of the Related Art

In an accessory-interchangeable camera system including a camera body to which an accessory apparatus is detachably attachable, the camera body and the accessory apparatus communicate with each other for controlling the accessory apparatus from the camera body and for providing, from the accessory apparatus to the camera body, data required for controlling the accessory apparatus.

In particular, when an interchangeable lens is used for capturing a moving image to be recorded or a live-view moving image to be displayed, smooth lens control in synchronization with image-capturing periods is required, so that it is necessary to synchronize image-capturing times in the camera body with control times in the interchangeable lens. Thus, the camera body is required to complete receipt of the data from the interchangeable lens and transmission of various commands and requests to the interchangeable lens in one image-capturing period. However, an increase in amount of the data to be received by the camera body from the interchangeable lens and a reduction of the image-capturing period (that is, an increase in a frame rate) require a large data volume communication in a shorter time. Japanese Patent Laid-Open No. 2010-237514 discloses a camera system having a one-directional communication mode (hereinafter referred to as "a high-speed mode") and a bidirectional communication mode (hereinafter referred to as "a low-speed mode"). In the high-speed mode, a one-directional communication channel for data transmission from a camera body to an interchangeable lens and another one-directional communication channel for data transmission from the interchangeable lens to the camera body are used in parallel, and thereby burst communication as continuous data communication capable of communicating a large amount of data by full-duplex communication is performed. On the other hand, in the low-speed mode, one communication channel is used whose communication direction is switched between transmission of a request from one of the camera body and the interchangeable lens to the other and transmission of data corresponding to the request from the other to the one.

However, when the camera system disclosed in Japanese Patent Laid-Open No. 2010-237514 falls into a situation where performing the continuous data communication is difficult due to an insufficient processing speed of a microcomputer provided in the interchangeable lens or the camera body in the high-speed mode, the camera system cannot suspend the transmission of data, which may make the data communication therebetween impossible.

In order to avoid such impossibility of the data communication, it is necessary to set as a communication standard a sufficiently low data communication speed with respect to performances of various possible microcomputers or to reduce the amount of data to be transmitted. However, these methods cannot effectively use the performances of microcomputers provided to the camera body and the interchangeable lens, which makes it impossible to achieve high-speed data communication. On the other hand, if a buffer provided to the camera body for storing data transmitted from the interchangeable lens has an insufficient capacity with respect to a large amount of data transmitted from the interchangeable lens in one burst communication, the buffer cannot store the entire transmitted data.

SUMMARY OF THE INVENTION

The present invention provides an accessory apparatus and an image-capturing apparatus capable of performing smooth and fast large volume date communication.

The present invention provides as an aspect thereof an accessory apparatus detachably attachable to an image-capturing apparatus. The accessory apparatus includes an accessory communicator configured to provide, with the image-capturing apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, and an accessory controller configured to, in a transmission request receiving state of receiving a transmission request as the notice from the image-capturing apparatus through the notification channel, transmit the accessory data in frame units to the image-capturing apparatus through the first data communication channel, and to receive the camera data in frame units transmitted through the second data communication channel from the image-capturing apparatus that is configured to transmit the camera data in response to receiving the accessory data in frame units. The accessory controller is configured to, in the transmission request receiving state and during transmission of the accessory data to the image-capturing apparatus, in response to becoming a non-transmission request receiving state of not receiving the transmission request from the image-capturing apparatus, stop transmitting the accessory data to the image-capturing apparatus.

The present invention provides as another aspect thereof an image-capturing apparatus to which an accessory apparatus is detachably attachable. The image-capturing apparatus includes a camera communicator configured to provide, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, and a camera controller configured to become and keep a transmission request providing state of providing a transmission request as the notice to the accessory apparatus through the notification channel to thereby cause the accessory apparatus to transmit the accessory data in frame units to the image-capturing apparatus through the first data communication channel, and, in response to receiving the accessory data in frame units from the accessory apparatus, transmit the camera data in frame units to the accessory apparatus through the second data communication channel. The camera controller is configured to become, from the transmission request providing state, a non-transmission request providing state of not providing the transmission request to the accessory apparatus to thereby cause the accessory apparatus to stop transmitting the accessory data to the image-capturing apparatus.

The present invention provides as yet another aspect thereof an image-capturing system including the above accessory and image-capturing apparatuses.

The present invention provides as still another aspect thereof a control method for an accessory apparatus detachably attachable to an image-capturing apparatus. The method includes the step of causing the accessory apparatus to provide, with the image-capturing apparatus, three channels that are a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus, the step of causing the accessory apparatus, in a transmission request receiving state of receiving a transmission request as the notice from the image-capturing apparatus through the notification channel, to transmit the accessory data in frame units to the image-capturing apparatus through the first data communication channel, and the step of causing the accessory apparatus to receive the camera data in frame units transmitted through the second data communication channel from the image-capturing apparatus that is configured to transmit the camera data in response to receiving the accessory data in frame units. The method further includes the step of causing the accessory apparatus, in the transmission request receiving state and during transmission of the accessory data to the image-capturing apparatus, in response to becoming a non-transmission request receiving state of not receiving the transmission request from the image-capturing apparatus, to stop transmitting the accessory data to the image-capturing apparatus.

The present invention provides as still another aspect thereof a control method for an image-capturing apparatus to which an accessory apparatus is detachably attachable. The method includes the step of causing the image-capturing apparatus to provide, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, the step of causing the image-capturing apparatus to become and keep a transmission request providing state of providing a transmission request as the notice to the accessory apparatus through the notification channel so as to cause the accessory apparatus to transmit the accessory data in frame units through the first data communication channel, and the step of causing the image-capturing apparatus, in response to receiving the accessory data in frame units, to transmit the camera data in frame units to the accessory apparatus through the second data communication channel. The method further includes the step of causing the image-capturing apparatus to become, from the transmission request providing state, a non-transmission request providing state of not providing the transmission request to the accessory apparatus to thereby cause the accessory apparatus to stop transmitting the accessory data to the image-capturing apparatus.

The present invention provides as yet still another aspect thereof an accessory apparatus detachably attachable to an image-capturing apparatus. The accessory apparatus includes an accessory communicator configured to provide, with the image-capturing apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, and an accessory controller configured to, in response to receiving a transmission request as the notice from the image-capturing apparatus through the notification channel, transmit the accessory data to the image-capturing apparatus through the first data communication channel and configured to receive the camera data transmitted from the image-capturing apparatus in response to receiving the accessory data through the second data communication channel. The accessory controller is configured to, during transmission of the accessory data to the image-capturing apparatus, in response to not receiving the transmission request from the image-capturing apparatus, stop transmitting the accessory data to the image-capturing apparatus, and configured to, after an elapsed time from not receiving the transmission request exceeds a predetermined time, in response to receiving the transmission request again, terminate transmitting the accessory data to the image-capturing apparatus.

The present invention provides as further another aspect thereof an image-capturing apparatus to which an accessory apparatus is detachably attachable. The image-capturing apparatus includes a camera communicator configured to provide, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, and a camera controller configured to provide a transmission request as the notice to the accessory apparatus through the notification channel to thereby cause the accessory apparatus to transmit the accessory data to the image-capturing apparatus through the first data communication channel and configured to, in response to receiving the accessory data, transmit the camera data to the accessory apparatus through the second data communication channel. The camera controller is configured to, during receipt of the accessory data from the accessory apparatus, stop providing the transmission request to thereby cause the accessory apparatus to stop transmitting the accessory data to the image-capturing apparatus, and configured to, after an elapsed time from not providing the transmission request to the accessory apparatus exceeds a predetermined time, provide the transmission request again to the accessory apparatus to thereby cause the accessory apparatus to terminate transmitting the accessory data to the image-capturing apparatus.

The present invention provides as yet further another aspect thereof an image-capturing system including the above accessory and image-capturing apparatuses.

The present invention provides as still further another aspect thereof a control method for an accessory apparatus detachably attachable to an image-capturing apparatus. The method includes the step of causing the accessory apparatus to provide, with the image-capturing apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, the step of causing the accessory apparatus, in response to receiving a transmission request as the notice from the image-capturing apparatus through the notification channel, to transmit the accessory data to the image-capturing apparatus through the first data communication channel, and the step of causing the accessory apparatus to receive the camera data transmitted through the second data communication channel from the image-capturing apparatus in response to receiving the accessory data. The method further includes the step of causing the accessory controller, during transmission of the accessory data to the image-capturing apparatus, in response to not receiving the transmission request from the image-capturing apparatus, to stop transmitting the accessory data to the image-capturing apparatus, and the step of causing the accessory controller, after an elapsed time from not receiving the transmission request exceeds a predetermined time, in response to receiving the transmission request again, to terminate transmitting the accessory data to the image-capturing apparatus.

The present invention provides as yet still further another aspect thereof a control method for an image-capturing apparatus to which an accessory apparatus is detachably attachable. The method includes the step of causing the image-capturing apparatus to provide, with the accessory apparatus, three channels that are a notification channel used for providing a notice from the image-capturing apparatus to the accessory apparatus, a first data communication channel used for transmitting accessory data from the accessory apparatus to the image-capturing apparatus, and a second data communication channel used for transmitting camera data from the image-capturing apparatus to the accessory apparatus, the step of causing the image-capturing apparatus to provide a transmission request as the notice to the accessory apparatus through the notification channel to thereby cause the accessory apparatus to transmit the accessory data to the image-capturing apparatus through the first data communication channel, and the step of causing the image-capturing apparatus, in response to receiving the accessory data, to transmit the camera data to the accessory apparatus through the second data communication channel. The method further includes the step of causing the image-capturing apparatus, during receipt of the accessory data from the accessory apparatus, to stop providing the transmission request to thereby cause the accessory apparatus to stop transmitting the accessory data to the image-capturing apparatus, and the step of causing the image-capturing apparatus, after an elapsed time from not providing the transmission request to the accessory apparatus exceeds a predetermined time, to provide the transmission request again to the accessory apparatus to thereby cause the accessory apparatus to terminate transmitting the accessory data to the image-capturing apparatus.

Moreover, the present invention provides as another aspect thereof a non-transitory storage medium storing a control program as a computer program for causing a computer to execute any one of the above control methods.

The present invention provides as further another aspect thereof a non-transitory storage medium storing a computer program for causing a computer to execute any one of the above control methods.

Further features and aspects of the present invention will become apparent from the following description of exemplary embodiments with reference to the attached drawings.

BRIEF DESCRIPTION OF THE DRAWINGS

FIGS. 5A to 5C illustrate waveforms of signals transmitted and received between a camera body and an interchangeable lens in a non-BUSY addition mode in a first communication setting in Embodiment 1.

FIGS. 8A to 8C illustrate waveforms of signals transmitted and received between the camera body and the interchangeable lens in the second communication setting in Embodiment 1.

FIG. 13 illustrates an example of setting of a predetermined time in a lens-interchangeable camera system that is Embodiment 3 of the present invention.

DESCRIPTION OF THE EMBODIMENTS

Exemplary embodiments of the present invention will be described below with reference to the accompanied drawings.

Embodiment 1

Figure 1:
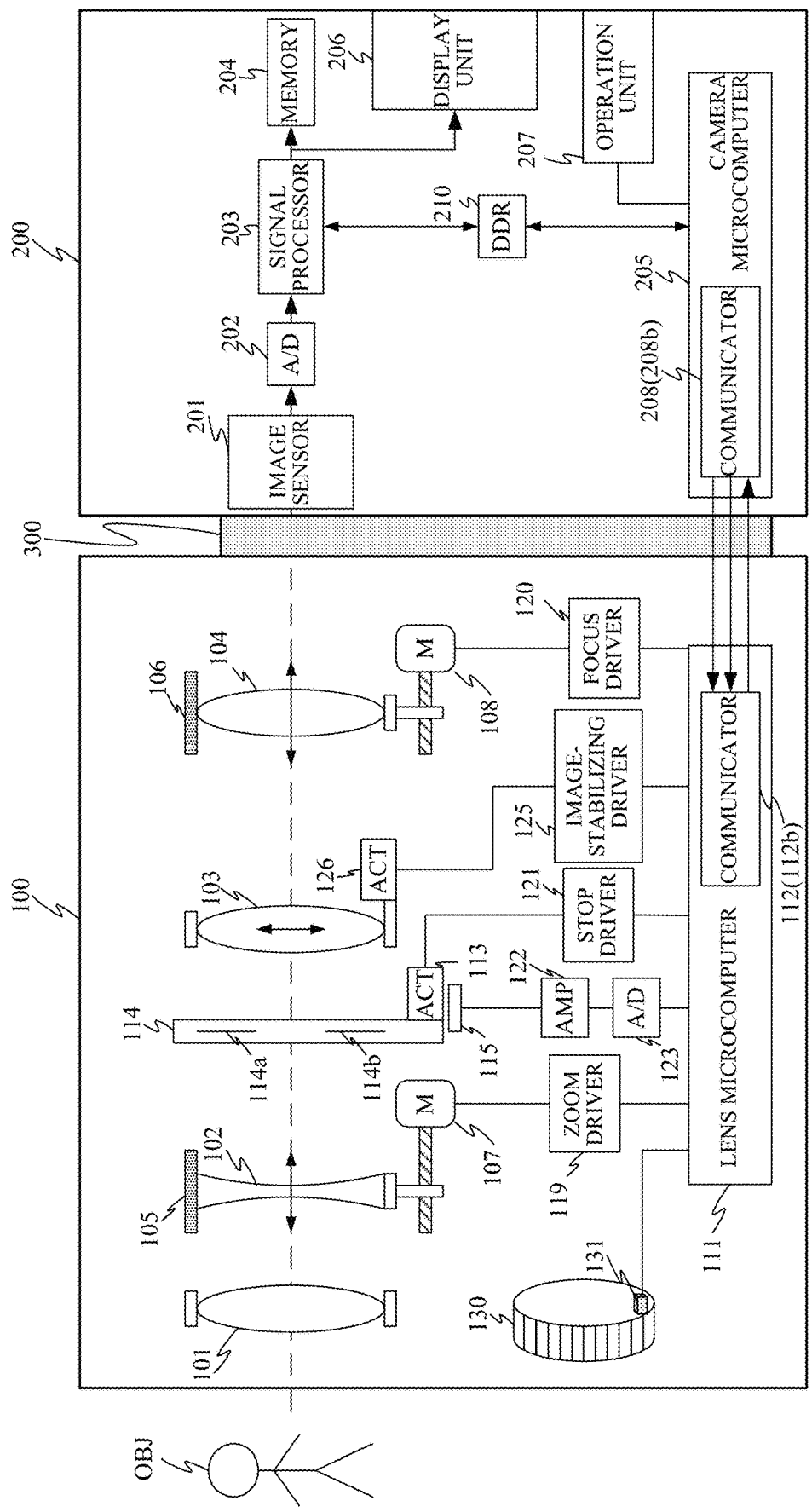
FIG. 1 is a block diagram illustrating a lens-interchangeable camera system that is Embodiment 1 of the present invention.

FIG. 1 illustrates a configuration of an image-capturing system (hereinafter referred to as "a camera system") including a camera body 200 as an image-capturing apparatus and an interchangeable lens 100 as an accessory apparatus that are a first embodiment (Embodiment 1) of the present invention.

The camera body 200 and the interchangeable lens 100 transmit control commands and internal information to each other via their communicators described later.

The communicators are compatible with various communication methods and switch their communication formats to the same one in synchronization with each other depending on types of data to be communicated and purposes of their communication, which enables selecting an optimum communication format for each of various situations.

Configurations of the interchangeable lens 100 and the camera body 200. The interchangeable lens 100 and the camera body 200 are mechanically and electrically connected with each other via a mount 300 including a coupling mechanism. The interchangeable lens 100 receives power supply from the camera body 200 via a power source terminal (not illustrated) provided in the mount 300 and supplies, to various actuators and a lens microcomputer described later, power sources necessary for their operations. The interchangeable lens 100 and the camera body 200 communicate with each other via communication terminals (illustrated in FIG. 2) provided in the mount 300.

The interchangeable lens 100 includes an image-capturing optical system. The image-capturing optical system includes, from an object (OBJ) side, a field lens 101, a magnification-varying lens 102 for variation of magnification, a stop unit 114 for light amount control, an image-stabilizing lens 103 for image blur correction and a focus lens 104 for focusing.

The magnification-varying lens 102 and the focus lens 104 are respectively held by lens holders 105 and 106. The lens holders 105 and 106 are guided by guide bars (not illustrated) movably in an optical axis direction in which an optical axis (illustrated by a broken line) of the image-capturing optical system extends and are driven in the optical axis direction respectively by stepping motors 107 and 108. The stepping motors 107 and 108 rotate in synchronization with drive pulses and respectively move the magnification-varying lens 102 and the focus lens 104.

The image-stabilizing lens 103 is moved in a direction orthogonal to the optical axis of the image-capturing optical system to reduce image blur caused by user's hand jiggling or the like.

The lens microcomputer 111 as an accessory controller controls various operations in the interchangeable lens 100. The lens microcomputer 111 receives, via a lens communicator 112 (including a lens data transceiver 112b) as an accessory communicator, control commands transmitted from the camera body 200 and transmission requests for lens data (accessory data) output therefrom. The lens microcomputer 111 performs various lens controls corresponding to the control commands and transmits lens data corresponding to the transmission requests via the lens communicator 112. The lens microcomputer 111 performs operations relating to the communication with the camera body 200 (that is, with a camera microcomputer 205 described later) according to a lens communication control program as a computer program.

This embodiment employs asynchronous serial communication as a communication method between the lens microcomputer 111 and the camera microcomputer 205. The lens microcomputer 111 and the camera microcomputer 205 can share error information indicating that an abnormality of the communication therebetween, that is, a communication error is generated.

In addition, the lens microcomputer 111 outputs, in response to a zoom command and a focus drive command among the control commands, a zoom drive signal and a focus drive signal to a zoom driver 119 and a focus driver 120 to cause them to drive the stepping motors 107 and 108, thereby performing a zoom process to control a magnification variation operation by the magnification-varying lens 102 and an AF (autofocus) process to control a focus operation by the focus lens 104.

The interchangeable lens 100 is provided with a manual focus ring 130 that is rotationally operable by a user and a focus encoder 131 for detecting a rotational operation amount of the manual focus ring 130. The lens microcomputer 111 causes the focus driver 120 to drive the stepping motor 108 by a drive amount corresponding to the rotational operation amount of the manual focus ring 130 detected by the focus encoder 131 to drive the focus lens 104, thereby performing MF (manual focus).

The stop unit 114 includes stop blades 114a and 114b. An open-and-close state of the stop blades 114a and 114b is detected by a hall element 115, and a detection result thereof is input to the lens microcomputer 111 through an amplifier 122 and an A/D converter 123. The lens microcomputer 111 outputs, depending on the input detection result from the A/D converter 123, a stop drive signal to a stop driver 121 so as to cause the stop driver 121 to drive a stop actuator 113, thereby controlling a light amount control operation of the stop unit 114.

The interchangeable lens 100 further includes a shake sensor (not illustrated and hereinafter referred to as "a gyro sensor") constituted by a vibration gyro or the like. The lens microcomputer 111 drives an image-stabilizing actuator 126 constituted by a voice coil motor or the like through an image-stabilizing driver 125 depending on a shake (angular velocity) detected by the gyro sensor, thereby performing an image-stabilizing process to control the movement of the image-stabilizing lens 103.

The camera body 200 includes an image sensor 201 constituted by a CCD sensor, a CMOS sensor or the like, an A/D converter 202, a signal processor 203, a recorder 204, the camera microcomputer 205 and a display unit 206.

The image sensor 201 photoelectrically converts an object image formed by the image-capturing optical system in the interchangeable lens 100 to output an image-capturing signal as an analog electrical signal.

The A/D converter 202 converts the analog image-capturing signal from the image sensor 201 into a digital image-capturing signal. The signal processor 203 performs various image processes on the digital image-capturing signal from the A/D converter 202 to produce a video signal. The signal processor 203 produces, from the video signal, focus information indicating a contrast state of the object image (that is, a focus state of the image-capturing optical system) and luminance information indicating an exposure state. The signal processor 203 outputs the video signal to the display unit 206. The display unit 206 displays the video signal as a live-view image used for checking an image-capturing composition and the focus state. In addition, the signal processor 203 outputs the video signal to the recorder 204. The recorder 204 records the video signal.

A memory 210 is constituted by, for example, a DDR (Double Data Rate SDRAM). The memory 210 stores the digital image-capturing signal obtained using the image sensor 201 and the video signal produced by the image processor 203 and stores the lens data received from the lens microcomputer 111.

The camera microcomputer 205 as a camera controller controls the camera body 200 in response to inputs from a camera operation unit 207 including an image-capturing instructing switch and various setting switches (not illustrated). The camera microcomputer 205 transmits, in response to a user's operation of a zoom switch (not illustrated), the control command relating to the magnification-varying operation of the magnification-varying lens 102 to the lens microcomputer 111 through a camera communicator 208 (including a camera data transceiver 208b). Moreover, the camera microcomputer 205 transmits, to the lens microcomputer 111 through the camera data transceiver 208b, the control command relating to the light amount control operation of the stop unit 114 depending on the luminance information and the control command relating to the focusing operation of the focus lens 104 depending on the focus information. The camera microcomputer 205 performs operations relating to the communication with the lens microcomputer 111 according to a camera communication control program as a computer program.

Figure 2:
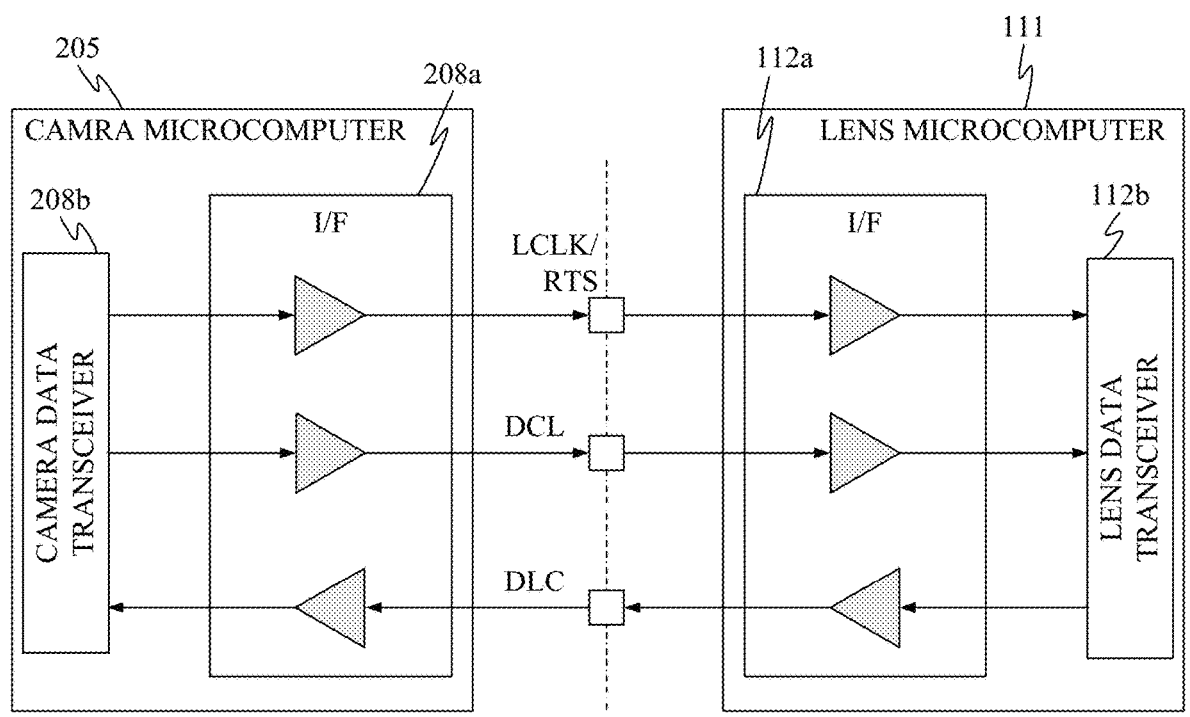
FIG. 2 illustrates a communication circuit between a camera body and an interchangeable lens in a first communication setting in Embodiment 1.

Next, with reference to FIG. 2, description will be made of a communication circuit constituted between the camera body 200 (camera microcomputer 205) and the interchangeable lens 100 (lens microcomputer 111) and of the communication performed therebetween. The camera microcomputer 205 has a function of managing settings for the communication with the lens microcomputer 111 and a function of providing notices such as the transmission requests. On the other hand, the lens microcomputer 111 has a function of producing lens data and a function of transmitting the lens data.

The camera microcomputer 205 includes a camera communication interface circuit 208a, and the lens microcomputer 111 includes a lens communication interface circuit 112a. The camera microcomputer 205 (camera data transceiver 208b) and the lens microcomputer 111 (lens data transceiver 112b) communicate with each other through the communication terminals (illustrated by three boxes) provided in the mount 300 and the camera and lens communication interface circuits 208a and 112a. In this embodiment, the camera and lens microcomputers 205 and 111 perform three-wire asynchronous serial communication using three channels. The camera data transceiver 208b and the camera communication interface circuit 208a constitute the camera communicator 208. The lens data transceiver 112b and the lens communication interface circuit 112a constitute the lens communicator 112.

The three channels are a transmission request channel as a notification channel, a first data communication channel and a second data communication channel. The transmission request channel is used for providing the notices such as the transmission requests (transmission instructions) for the lens data and switch requests (switch instructions) for communication settings described later, from the camera microcomputer 205 to the lens microcomputer 111. The provision of the notice through the transmission request channel is performed by switching a signal level (voltage level) on the transmission request channel between High as a first level and Low as a second level. A transmission request signal provided to the transmission request channel is hereinafter referred to as "a request-to-send signal RTS".

The first data communication channel is used for transmitting the lens data from the lens microcomputer 111 to the camera microcomputer 205. The lens data transmitted as a signal from the lens microcomputer 111 to the camera microcomputer 205 through the first data communication channel is hereinafter referred to as "a lens data signal DLC". The second data communication channel is used for transmitting camera data from the camera microcomputer 205 to the lens microcomputer 111. The camera data transmitted as a signal from the camera microcomputer 205 to the lens microcomputer 111 through the second data communication channel is hereinafter referred to as "a camera data signal DCL".

The request-to-send signal RTS is provided from the camera microcomputer 205 as a communication master to the lens microcomputer 111 as a communication slave.

The camera data signal DCL includes various control commands and transmission request commands transmitted from the camera microcomputer 205 to the lens microcomputer 111. The lens data signal DLC includes various lens data transmitted from the lens microcomputer 111 to the camera microcomputer 205.

The camera and lens microcomputers 205 and 111 set their communication speed beforehand and perform the communication (transmission and receipt) at a communication bit rate according to this setting. The communication bit rate indicates a data amount transferable per second and is expressed with a unit of bps (bits per second). The camera and lens microcomputers 205 and 111 communicate with each other by a full-duplex communication method enabling mutual transmission and receipt of data.

The communication method between the camera body 200 and the interchangeable lens 100 may be performed by three-channel clock-synchronous serial communication instead of the three-channel asynchronous serial communication. Furthermore, in a case of performing large volume data transmission from the lens microcomputer 111 to the camera microcomputer 205, the clock-synchronous serial communication may be switched to the asynchronous serial communication. In this case, the notification channel may be used as a clock line for providing a clock signal from the camera microcomputer 205 to the lens microcomputer 111. This enables selectively using the two communication methods, that is, the asynchronous serial communication and the clock-synchronous serial communication without adding a new channel.

In the clock-synchronous serial communication using the three channels, a clock signal CLK is provided from the camera microcomputer 205 as a communication master to the lens microcomputer 111 as a communication slave through a clock channel. The camera data signal DCL includes various control commands and transmission request commands transmitted from the camera microcomputer 205 to the lens microcomputer 111.

The lens data signal DLC includes various lens data transmitted from the lens microcomputer 111 to the camera microcomputer 205 in synchronization with the clock signal LCLK. In the clock-synchronous serial communication, the camera and lens microcomputers 205 and 111 communicate with each other by a full-duplex communication method enabling mutual transmission and receipt of data in synchronization with the clock signal LCLK.

Figure 3:
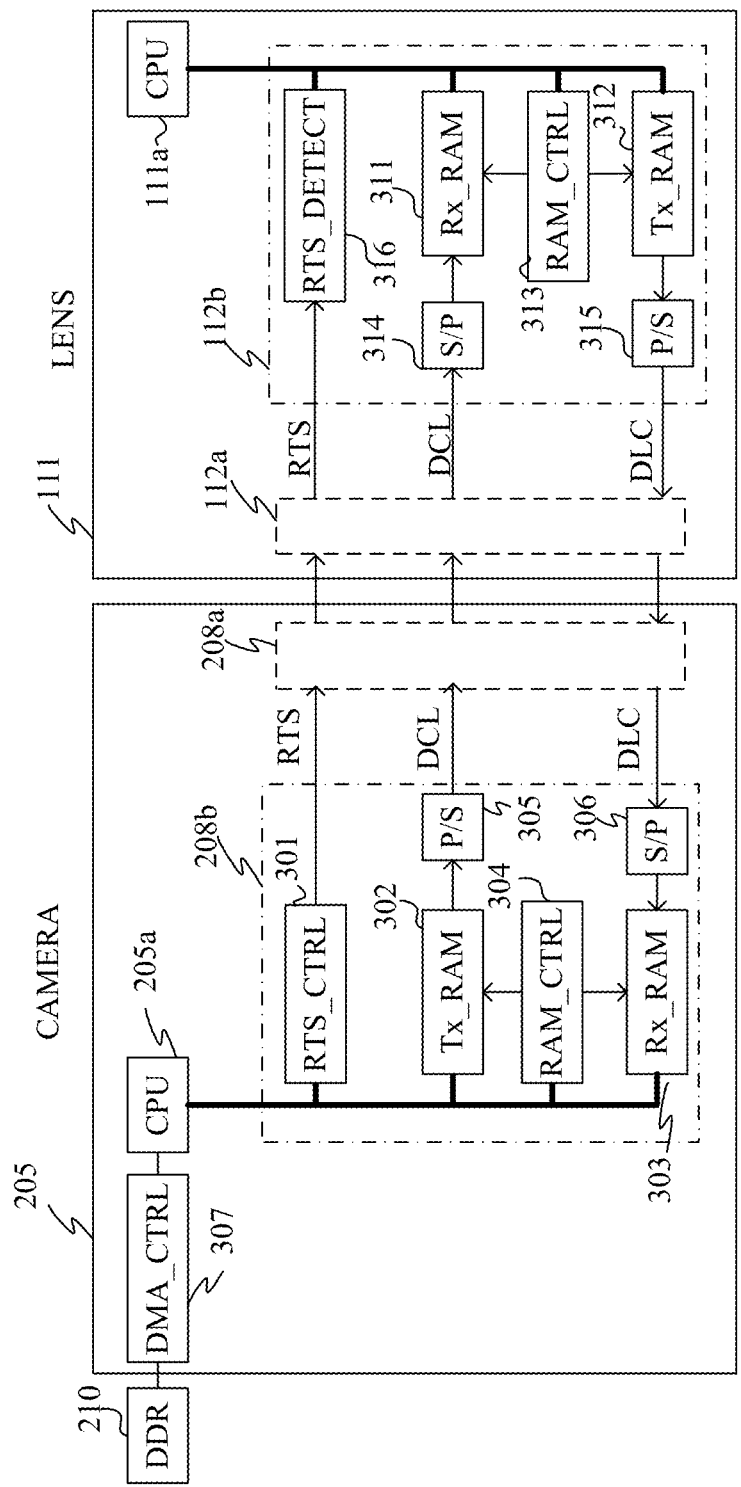
FIG. 3 is a diagram illustrating a configuration of camera and lens data transceivers in a first communication setting in Embodiment 1.

Next, with reference to FIGS. 3 to 5C and FIGS. 9A and 9B, description will be made of a first communication setting that is one of communication settings between the camera and lens microcomputers 205 and 111. FIG. 3 illustrates a configuration of the camera data transceiver 208b in the camera microcomputer 205 and the lens data transceiver 112b in the lens microcomputer 111. The camera microcomputer 205 includes a CPU 205a as a core of the camera microcomputer 205, an RTS controller 301 and a transmission data buffer 302 as a camera data buffer constituted by a RAM or the like. The camera microcomputer 205 further includes a receipt data buffer 303 constituted by a RAM or the like and a buffer controller 304 that controls data storing and data read-out to and from the buffers 302 and 303.

On the other hand, the lens microcomputer 111 includes a CPU 111a as a core of the lens microcomputer 111, an RTS detector 316 and a receipt data buffer 311 constituted by a RAM or the like. The camera microcomputer 111 further includes a transmission data buffer 312 as an accessory data buffer constituted by a RAM or the like and a buffer controller 313 that controls data storing and data read-out to and from the buffers 311 and 312.

The camera data signal DCL to be transmitted from the camera microcomputer 205 to the lens microcomputer 111 is stored to the transmission data buffer 302. For example, when the camera data signal DCL of 128 bytes is transmitted, this camera data signal DCL of 128 bytes is first stored to the transmission data buffer 302 and then is transmitted to the lens microcomputer 111. The buffer controller 304 reads out the camera data signal DCL frame by frame from the transmission data buffer 302. The read camera data signal DCL of each frame is converted from a parallel data signal into a serial data signal by the parallel-serial converter 305 and is transmitted in frame units (frame by frame) from the camera microcomputer 205 to the lens microcomputer 111 through the second data communication channel. The camera data signal DCL transmitted from the camera microcomputer 205 is converted from the serial data signal into a parallel data signal by the serial-parallel converter 314 in the lens microcomputer 111. The buffer controller 313 stores the camera data signal DCL converted into the parallel data signal to the receipt data buffer 311.

The lens data signal DLC to be transmitted from the lens microcomputer 111 to the camera microcomputer 205 is stored to the transmission data buffer 312. For example, when the lens data signal DLC of 128 bytes is transmitted, this lens data signal DLC of 128 bytes is first stored to the transmission data buffer 312 and then is transmitted to the camera microcomputer 205. The buffer controller 313 reads out the lens data signal DLC frame by frame from the transmission data buffer 312. The read lens data signal DLC of each frame is converted from a parallel data signal into a serial data signal by the parallel-serial converter 315 and is transmitted in frame units (frame by frame) from the lens microcomputer 111 to the camera microcomputer 205 through the first data communication channel.

The lens data signal DLC transmitted from the lens microcomputer 111 is converted from the serial data signal into a parallel data signal by the serial-parallel converter 306 in the camera microcomputer 205.

The buffer controller 304 stores the lens data signal DLC converted into the parallel data signal to the receipt data buffer 303. The lens data signal DLC stored in the receipt data buffer 303 is read out therefrom by a DMA controller 307, and the read lens data signal DLC is transferred and stored to the memory 210.

Figure 4A:
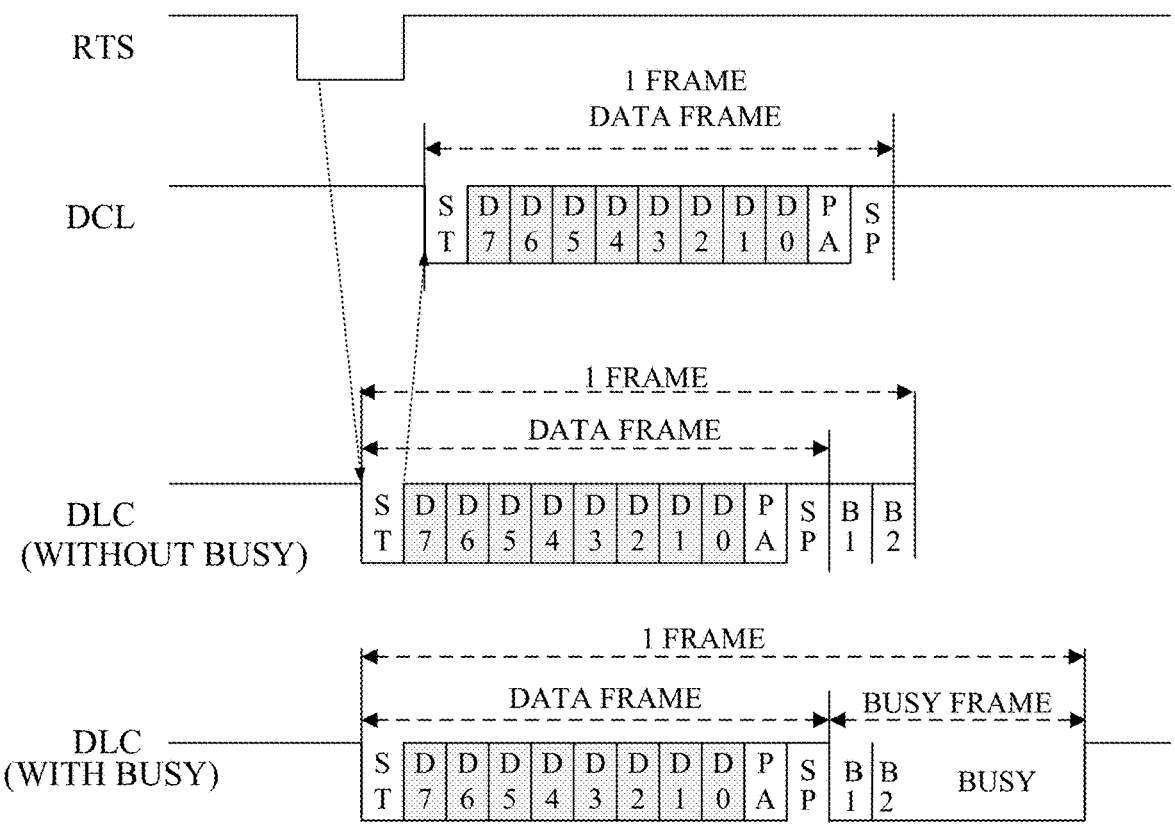
FIGS. 4A to 4C illustrate waveforms of signals transmitted and received between the camera body and the interchangeable lens in the first communication setting in Embodiment 1.
Figure 4B:
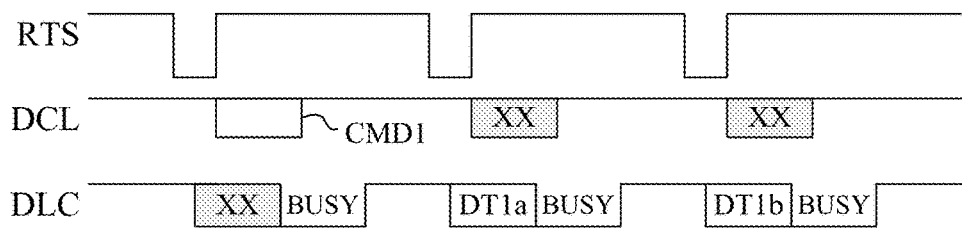
Figure 4C:
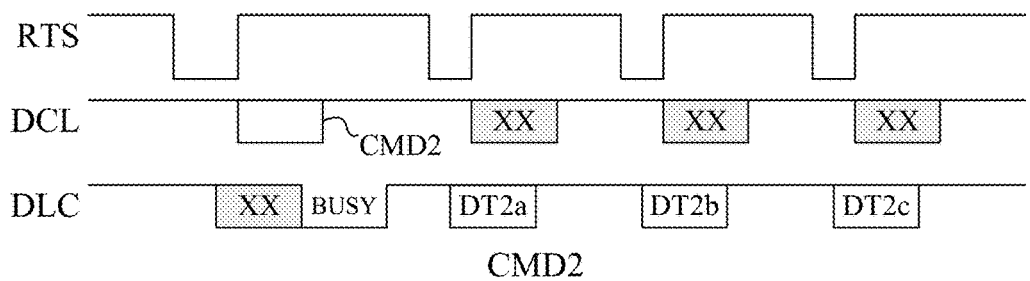

This first communication setting further includes, as described later, a communication setting (hereinafter referred to as "a BUSY addition mode") in which a busy frame is added and a communication setting (hereinafter referred to as "a non-BUSY addition mode") in which the busy frame is not added. FIGS. 4A to 4C illustrates waveforms of signals transmitted and received between the camera and lens microcomputers 205 and 111 in the first communication setting. An arrangement of procedures of the signal transmission and receipt is called a communication protocol.

FIG. 4A illustrates signal waveforms of one frame as a minimum communication unit. The camera data signal DCL and the lens data signal DLC have mutually different parts in their data formats in the one frame.

First, description will be made of the data format of the lens data signal DLC. The lens data signal DLC in the one frame includes, as large parts, a data frame as a first frame and a BUSY frame as a subsequent frame. A signal level of the lens data signal DLC is held at High in a non-transmission state where data transmission is not performed.

The lens microcomputer 111 sets the signal level to Low in one bit time period in order to provide a notice of a start of one frame transmission of the lens data signal DLC to the camera microcomputer 205. The one bit time period indicating a start of one frame is called "a start bit ST" in this embodiment. That is, one data frame is started from this start bit ST. The start bit ST is provided as a head bit of each one frame of the lens data signal DLC.

Next, the lens microcomputer 111 transmits one-byte lens data in 8 bit time period from a subsequent second bit to a ninth bit. The data bits are arranged in an MSB-first format starting from a highest-order data bit D7 and continuing to data bits D6, D5, D4, D3, D2 and D1 in this order and ending with a lowest-order data bit D0. Then, the lens microcomputer 111 adds one bit parity information (parity bit) PA at a tenth bit and sets the signal level of the lens data signal DLC to High in a time period of a stop bit SP indicating an end of the one frame. Thus, the data frame starting from the start bit SP ends.

Thereafter, as illustrated by "DLC (with BUSY)" in FIG. 4A, the lens microcomputer 111 adds the BUSY frame after the stop bit SP. The BUSY frame indicates a time period of a communication standby request BUSY as a notice (hereinafter referred to as "a BUSY notice") from the lens microcomputer 111 to the camera microcomputer 205. The lens microcomputer 111 holds the signal level of the lens data signal DLC to Low until terminating the BUSY notice. On the other hand, for a case where the BUSY notice is unnecessary to be provided from the lens microcomputer 111 to the camera microcomputer 205, as illustrated by "DLC (without BUSY)" in FIG. 4A, a data format is provided that forms one frame without adding the BUSY notice (BUSY frame). That is, the lens microcomputer 111 can select as the data format of the lens data signal DLC, depending on a process situation, one to which the BUSY notice is added and one to which the BUSY notice is not added.

Description will be made of a method of determining the presence and absence of the BUSY notice; the method is performed by the camera microcomputer 205. In FIG. 4A, the signal waveform of "DLC (without BUSY)" and the signal waveform of "DLC (with BUSY)" both include bit positions B1 and B2. The camera microcomputer 205 selects one of these bit positions B1 and B2 as a BUSY determination position P for determining the presence and absence of the BUSY notice. As just described, this embodiment employs a data format that selects the BUSY determination position P from the bit positions B1 and B2. This data format enables addressing a problem that a process time from the transmission of the data frame of the lens data signal DLC until the determination of the presence of the BUSY notice (the lens data signal DLC is set to Low) is changed depending on a processing performance of the lens microcomputer 111. Whether to select the bit position B1 or B2 as the BUSY determination position P is set by the communication between the camera and lens microcomputers 205 and 111 before the data communication therebetween is performed. The BUSY determination position P is not necessary to be fixed at the bit position B1 or B2 and may be changed depending on processing capabilities of the camera and lens microcomputers 205 and 111.

FIG. 4B illustrates signal waveforms in a case of performing continuous communication in the BUSY addition mode illustrated by "DLC (with BUSY)" in FIG. 4A. The BUSY notice (BUSY frame) from the lens microcomputer 111 is provided using the lens data signal DLC through the first data communication channel, and a subsequent communication is started after the BUSY notice is terminated. In FIG. 4B, CMD1 represents a transmission request command that is transmitted as the camera data signal DCL from the camera microcomputer 205 to the lens microcomputer 111. The lens microcomputer 111 transmits, in response to receiving this transmission request command CMD1, lens data signals DT1 (DT1a and DT1b) of two bytes corresponding to the transmission request command CMD1 to the camera microcomputer 205.

FIG. 4C illustrates signal waveforms in a case of performing communication with switching the communication setting (communication mode) between the BUSY addition mode and the non-BUSY addition mode. In an example of FIG. 4C, the communication is first performed in the BUSY addition mode and then performed in the non-BUSY addition mode. In FIG. 4C, CMD2 represents a control command and a transmission request command that are transmitted as the camera data signal DCL from the camera microcomputer 205 to the lens microcomputer 111. Although FIG. 4C illustrates a case where the camera microcomputer 205 transmits the control and transmission request commands in one frame, the control and transmission request commands may be transmitted in mutually separate frames. The lens microcomputer 111 switches, in response to receiving the control command in the command CMD2, the communication mode from the BUSY addition mode to the non-BUSY addition mode. Then, the lens microcomputer 111 transmits, in response to receiving the transmission request command in the command CMD2, lens data signals DT2 (DT2a to DT2c) of three bytes corresponding to the transmission request command to the camera microcomputer 205.

Next, description will be made of a data format of the camera data signal DCL. Specifications of the data format of the camera data signal DCL in one frame are common to those of the lens data signal DLC. However, the addition of the BUSY frame to the camera data signal DCL is prohibited, which is different from the lens data signal DLC.

Next, the communication procedures between the camera and lens microcomputers 205 and 111 in the first communication setting will be described. First, the communication procedures in the BUSY addition mode will be described.

The camera microcomputer 205 sets, when an event for starting the communication with the lens microcomputer 11 is generated, a signal level of the request-to-send signal RTS to Low (in other words, asserts the request-to-send signal RTS) to provide the transmission request to the lens microcomputer 111. The lens microcomputer 111 having detected the transmission request through the assertion (Low) of the request-to-send signal RTS performs a process to produce the lens dada signal DLC to be transmitted to the camera microcomputer 205. Then, after a preparation for transmitting the lens data signal DLC is completed, the lens microcomputer 111 starts transmitting one frame of the lens data signal DLC through the first data communication channel.

The lens microcomputer 111 starts the transmission of the lens data signal DLC within a time period mutually set by the camera and lens microcomputers 205 and 111 after the assertion of the request-to-send signal RTS. That is, for the lens microcomputer 111, a strict restriction is not provided that it is necessary to set the lens data to be transmitted before a first clock pulse is input thereto in a time period from the assertion of the request-to-send signal RTS to a start of the transmission of the lens data signal DLC.

Next, in response to detecting the start bit ST as a head bit of the data frame of the lens data signal DLC received from the lens microcomputer 111 (that is, in response to a start of receiving the lens data signal DLC), the camera microcomputer 205 returns the signal level of the request-to-send signal RTS to High, in other words, negates the request-to-send signal RTS. The camera microcomputer 205 thereby terminates the transmission request and starts the transmission of the camera data signal DCL through the second data communication channel. The negation of the request-to-send signal RTS may be performed any one of before and after the start of the transmission of the camera data signal DCL. It is only necessary that these negation and transmission be performed until the receipt of the data frame of the lens data signal DLC is completed.

The lens microcomputer 111 having transmitted the data frame of the lens data signal DLC adds the BUSY frame to the lens data signal DLC in a case where the BUSY notice is necessary to be provided to the camera microcomputer 205. The camera microcomputer 205 monitors the presence and absence of the BUSY notice and prohibits the assertion of the request-to-send signal RTS for a subsequent transmission request while the BUSY notice is provided. The lens microcomputer 111 executes necessary processes in a time period where the communication from the camera microcomputer 205 is prohibited by the BUSY notice and terminates the BUSY notice after a subsequent communication preparation is completed. The assertion of the request-to-send signal RTS by the camera microcomputer 205 for the subsequent transmission request is permitted under a condition that the BUSY notice is terminated and the transmission of the data frame of the camera data signal DCL is completed.

As just described, in this embodiment, in response to the assertion of the request-to-send signal RTS upon the generation of the communication starting event in the camera microcomputer 205, the lens microcomputer 111 starts transmitting the data frame of the lens data signal DLC to the camera microcomputer 205. On the other hand, the camera microcomputer 205 starts, in response to detecting the start bit ST of the lens data signal DLC, transmitting the data frame of the camera data signal DCL to the lens microcomputer 111. The lens microcomputer 111 adds, as needed, the BUSY frame to the data frame of the lens data signal DLC for providing the BUSY notice and then terminates the BUSY notice to end one frame communication process. In this communication process, the camera microcomputer 205 and the lens microcomputer 111 mutually transmit and receive one byte data.

Next, the communication procedures in the non-BUSY addition mode will be described. The non-BUSY addition mode enables a higher-speed data communication as compared with the BUSY addition mode because the BUSY frame is not added.

FIG. 5A illustrates signal waveforms when three frames in which each one frame is a minimum communication unit are continuously communicated in the non-BUSY addition mode between the camera and lens microcomputers 205 and 111. As described above, in the non-BUSY addition mode, the BUSY notice is not added to the lens data signal DLC. In the non-BUSY addition mode, the data format of one frame of the lens data signal DLC is formed only by the data frame, that is, does not include the BUSY frame. Therefore, in the non-BUSY addition mode, the lens microcomputer 111 cannot provide the BUSY notice to the camera microcomputer 205. This data format is used for burst communication as continuous communication in which each interval between frames is shortened so as to transmit relatively large volume data between the camera microcomputer 205 and the lens microcomputer 111. That is, the non-BUSY addition mode enables large volume data communication at a higher speed.

Furthermore, in the non-BUSY addition mode, each frame of the lens data signal DLC includes two stop bits SP as final bits, which is more than that of each frame of the camera data signal DCL. This difference in stop bit number makes a bit length of one frame of the lens data signal DLC longer than that of one frame of the camera data signal DCL. The reason for the longer bit length will be described later.

FIG. 5B illustrates signal waveforms when the camera microcomputer 205 and the lens microcomputer 111 continuously transmit and receive n frames of the camera data signal DCL and n frames of the lens data signal DLC (that is, when performing the burst communication). Prior to starting this communication, the camera microcomputer 205 receives a notice indicating n frames as data size (frame number) information from the lens microcomputer 111 responding to receiving the camera data signal DCL of one frame illustrated in FIG. 4A.

The camera microcomputer 205 asserts the request-to-send signal RTS when an event for starting the communication with the lens microcomputer 111 is generated. Thereafter, in the non-BUSY addition mode in which it is unnecessary to negate the request-to-send signal RTS at each frame in contrast to in the BUSY addition mode, the camera microcomputer 205 maintains the assertion of the request-to-send signal RTS while performing continuous data communication (transmission and receipt) with the lens microcomputer 111.

The lens microcomputer 111 performs, in response to detecting a transmission request by the assertion of the request-to-send signal RTS, a process for producing the lens data signal DLC to be transmitted to the camera microcomputer 205. Then, after a preparation for transmitting the lens data signal DLC is completed, the lens microcomputer 111 starts transmitting a first frame DL1 of the lens data signal DLC to the camera microcomputer 205 through the first data communication channel.

The lens microcomputer 111 having transmitted the data frame of the first frame of the lens data signal DLC rechecks the request-to-send signal RTS. If the request-to-send signal RTS is asserted, the lens microcomputer 111 transmits, after the first frame whose transmission has been completed, a second frame DL2 of the lens data signal DLC to the camera microcomputer 205. In this way, while the assertion of the request-to-send signal RTS is maintained by the camera microcomputer 205, the lens microcomputer 111 continuously transmits the n frames DL1 to DLn of the lens data signal DLC to the camera microcomputer 205. Then, if the transmission of the n frames indicated in the data size information is completed, the transmission of the lens data signal DLC is stopped.

The camera microcomputer 205 transmits, in response to detecting the start bits ST of the frames of the lens data signal DLC from the lens microcomputer 111, n frames DC1 to DCn of the camera data signal DCL through the second data communication channel. Thus, the assertion of the request-to-send signal RST maintained by the camera microcomputer 205 enables continuous transmission and receipt of the lens and camera data signals DLC and DCL whose each frame number corresponds to the data size information. The camera microcomputer 205 temporarily stores the n frames of the lens data signal DLC continuously received from the lens microcomputer 111 to the receipt data buffer 303 through the serial-parallel converter 306. The DMA controller 307 transfers the n frames of the lens data signal DLC stored in the receipt data buffer 303 to the memory 210 to finally store these n frames to the memory 210. Therefore, to receive a larger data amount of the lens data signal DLC than a capacity of the receipt data buffer 303, it is necessary to transfer the lens data signal DLC stored before in the receipt data buffer 303 to the memory 210 so as to secure a free space of the receipt data buffer 303. However, when the DMA controller 307 cannot access the memory 210 due to a processing situation of the signal processor 203 provided in the camera body 200, it is impossible to transfer the n frames of the lens data signal DLC continuously received from the lens microcomputer 111 to the memory 210. This results in a lack of the free space of the receipt data buffer 303, which makes it impossible to store part of the lens data signal DLC to the memory 210. For example, if remaining data of the lens data signal DLC in the receipt data buffer 303, the remaining data being part of the lens data signal DLC received before by the camera microcomputer 205 and being not transferred to the memory 210, is overwritten by newly received data, the rewritten data is not stored to the memory 210. Thus, it is necessary to suspend (temporarily stop) the communication performed between the camera and lens microcomputers 205 and 111 before the data stored in the receipt data buffer 303 is overwritten.

FIG. 5C illustrates signal waveforms in a case where, during the continuous data communication illustrated in FIG. 5B, the camera microcomputer 205 or the lens microcomputer 111 instructs a suspension of the communication. Also in this case, in response to the assertion of the request-to-send signal RTS by the camera microcomputer 205, the lens microcomputer 111 starts transmitting the lens data signal DLC. Then, in response to detecting the start bit ST of the lens data signal DLC, the camera microcomputer 205 starts transmitting the camera data signal DCL.

In FIG. 5C, T2w1 represents a communication suspension time period where the suspension of the communication is instructed by the camera microcomputer 205. In response to generation of a communication suspension event, the camera microcomputer 205 instructs the lens microcomputer 111 to suspend the communication (that is, provides a communication suspension instruction to the lens microcomputer 111) by temporarily negating the request-to-send signal RTS. In response to detecting the negation of the request-to-send signal RTS, the lens microcomputer 111 suspends transmitting the lens data signal DLC after completing transmitting a frame incompletely transmitted at the time of detecting the negation (this last transmitted frame is illustrated as DL6 in FIG. 5C and hereinafter referred to as "a suspension frame"). In response to the transmission suspension of the camera data signal DLC, the camera microcomputer 205 also suspends transmitting the camera data signal DCL after completing transmitting a frame (illustrated as DC6 in FIG. 5C) thereof corresponding to the suspension frame of the lens data signal DLC.

Such communication control enables, even when the communication suspension instruction is provided during the continuous data communication, managing so as to make a transmitted frame number of the lens data signal DLC equal to that of the camera data signal DCL, that is, so as to synchronize the transmissions of the lens and camera data signals DLC and DCL. In response to termination of the communication suspension event, the camera microcomputer 205 is allowed to assert the request-to-send signal RTS again to instruct the lens microcomputer 111 to restart the communication (that is, provides a communication restart instruction to the lens microcomputer 111). The lens microcomputer 111 restarts, in response to the communication restart instruction, transmitting the lens data signal DLC from a frame subsequent to the suspension frame (this subsequent frame is illustrated as DL7 in FIG. 5C and hereinafter referred to as "a restart frame"). Then, in response to detecting the start bit ST of the restart frame, the camera microcomputer 205 restarts transmitting the camera data signal DCL from a frame DC7 thereof corresponding to the restart frame of the lens data signal DLC.

As just described, the camera microcomputer 205 temporarily negates the request-to-send signal RTS to suspend the communication with the lens microcomputer 111. Then, if a received frame number of the lens data signal DLC at the time of the suspension is less than the frame number indicated in the data size information, the camera microcomputer 205 is allowed to restart receiving the lens data signal DLC from the lens microcomputer 111.

After the end of the communication suspension time period T2w1, the lens and camera microcomputers 111 and 205 do not instruct or notify of a suspension of the communication and perform continuous data transmission in order from the above-described restart frames DL7, DC7 to subsequent frames DL8, DC8 and DL9 and DC9.

Then, in response to occurrence of a communication suspension request event when the transmission of the frame DL9 (and receipt of the frame DC9 in the camera microcomputer 205), the lens microcomputer 111 notifies the camera microcomputer 205 of a suspension of the communication. The notification is performed by not transmitting the lens data signal DLC to the camera microcomputer 205 even though the request-to-send signal RTS is asserted. In FIG. 5C, T2w2 represents a communication suspension time period where the suspension of the communication is instructed by the lens microcomputer 111.

The camera microcomputer 205 always monitors the start bit ST of each frame of the lens data signal DLC and is programmed to stop, in response to not detecting the start bit ST of a certain frame of the lens data signal DLC, transmitting a subsequent frame of the camera data signal DCL. Therefore, the camera microcomputer 205 stops, when not receiving the lens data signal DLC (DL10 in FIG. 5C) from the lens microcomputer 111 even though asserting the request-to-send signal RTS, transmitting the camera data signal DCL (DC10 in FIG. 5C) to the lens microcomputer 111, thereby stopping the communication the camera microcomputer 205 keeps the assertion of the request-to-send signal RTS during the communication suspension time period T2w2 instructed by the lens microcomputer 111.

Thereafter, in response to termination of the communication suspension request event in the lens microcomputer 111, the lens microcomputer 111 restarts transmitting the restart frame DL10 of the lens data signal DLC. The camera microcomputer 205 restarts, in response to detecting the start bit ST of the restart frame DL10, transmitting the corresponding frame DC10 of the camera data signal DCL.

Figures 9A, 9B:
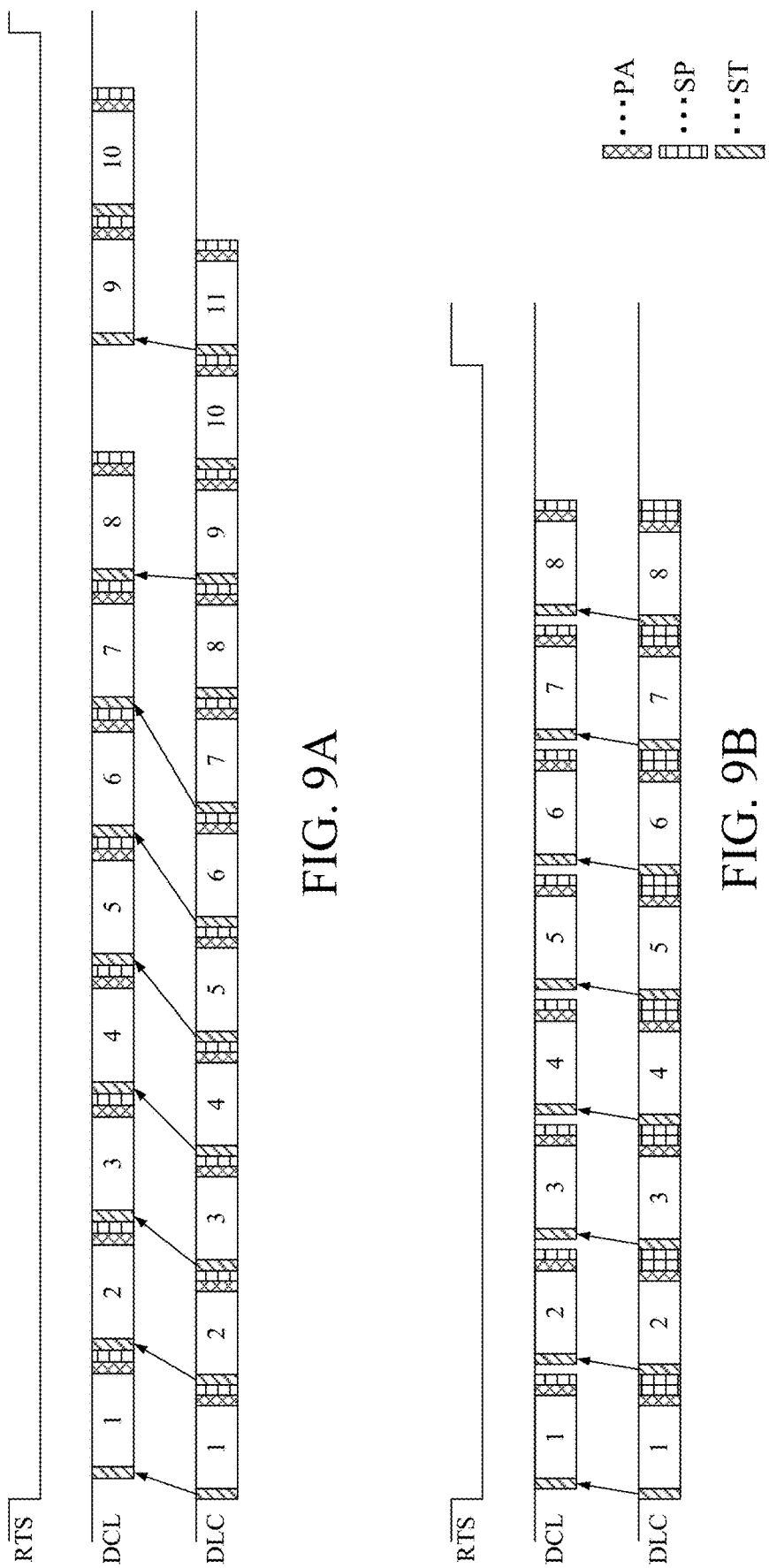
FIGS. 9A and 9B illustrate data frames transmitted and received between the camera body and the interchangeable lens in the first communication setting in Embodiment 1.

Next, with reference to FIG. 9A, description will be made of a problem that may occur when, in the non-BUSY addition mode, a bit rate of the camera data signal DCL output from the camera microcomputer 205 and that of the lens data signal DLC output from the lens microcomputer 111 are different from each other. FIG. 9A illustrates a relation of frames of the camera and lens data signals DCL and DLC when the camera and lens data signals DCL and DLC have the same bit length of one frame (data frame) and the bit rate of the camera data signal DCL is slower than that of the lens data signal DLC. Arrows in FIG. 9A illustrates which start bit ST of the lens data signal DLC is detected by the camera microcomputer 205 and which frame of the camera data signal DCL is transmitted from the camera microcomputer 205 to the lens microcomputer 111.

Since the bit rate of the camera data signal DCL is slower than that of the lens data signal DLC, delays of the frames of the camera data signals DCL with respect to the frames of the lens data signal DLC are gradually increased. The camera and lens microcomputers 205 and 111 are performing continuous data communication, so that gaps (non-communication time periods) are not provided between the frames. Accordingly, accumulation of the delays causes a shift of one frame or more between the camera and lens data signals DCL and DLC, which generates a difference between the transmitted frame numbers of the camera and lens data signals DCL and DLC. Furthermore, the above shift between the camera and lens data signals DCL and DLC causes the camera microcomputer 205 to skip the start bit ST of one frame of the lens data signal DLC, which generates a time period corresponding to about one frame where the camera data signal DCL is not transmitted to the lens microcomputer 111. Such a situation makes it difficult to manage the transmitted frame numbers (communication data amounts) between the camera and lens microcomputers 205 and 111 and makes the data communication therebetween impossible.

Thus, this embodiment provides, as illustrated in FIGS. 5A and 9B, a greater number of the stop bits SP in each frame of the lens data signal DLC than that in each frame of the camera data signal DCL. specifically, each frame of the camera data signal DCL includes one stop bit SP, and on the other hand, each frame of the lens data signal DLC includes two stop bits SP. The data formats of the lens and camera data signals DLC and DCL are mutually the same except for the stop bit number. The difference in stop bit number makes the bit number of one frame (data frame) of the lens data signal DLC greater than that of one frame of the camera data signal DCL. In other words, the difference in stop bit number makes the bit length of one frame of the lens data signal DLC longer than that of one frame of the camera data signal DCL. This setting enables, even when the bit rate of the camera data signal DCL is slower than that of the lens data signal DLC, preventing the shifts of the frames of the camera data signal DCL with respect to the frames of the lens data signal DLC from being accumulated.

When the bit rates of the lens and camera data signals DLC and DCL are equal to each other, the longer bit length of one frame of the lens data signal DLC than that of one frame of the camera data signal DCL causes the transmission of the camera data signal DCL to be completed earlier than that of the lens data signal DLC. Furthermore, even when the bit rate of the camera data signal DCL is slower than that of the lens data signal DLC due to a bit rate error, one bit as a bit length difference of one frame is a sufficient margin amount for absorbing a transmission time difference between corresponding frames of the camera and lens data signals DCL and DLC due to the bit rate error.

On the other hand, when the bit rate of the camera data signal DCL is faster than that of the lens data signal DLC, the above-described frame shift problem does not occur. This is because the setting is made that each frame of the camera data signal DCL is transmitted in response to detecting the start bit ST in each frame of the lens data signal DLC. Furthermore, even when the bit rates settable in the camera body 200 and the interchangeable lens 100 are slightly different from each other, increasing the bit number of the stop bits SP in each frame of the lens data signal DLC enables responding to the difference.

As described above, in the BUSY addition mode in the first communication setting, the camera microcomputer 205 can notify the lens microcomputer 111 of the suspension of the communication by temporarily negating the request-to-send signal RTS. Furthermore, the lens microcomputer 111 adds the BUSY notice (BUSY frame) to the lens data signal DLC to notify the camera microcomputer 205 of the suspension of the communication. These functions of the camera and lens microcomputers 205 and 111 enable smooth and fast data communication therebetween.

On the other hand, in the non-BUSY addition mode in the first communication setting, the camera microcomputer 205 can notify the lens microcomputer 111 of the suspension of the communication during the burst communication from the lens microcomputer 111 to the camera microcomputer 205 by temporarily negating the request-to-send signal RTS. This function of the camera microcomputers 205 and 111 enables performing a large volume data communication at a high speed between the camera and lens microcomputers 205 and 111 while synchronizing them with each other.

Figure 6:
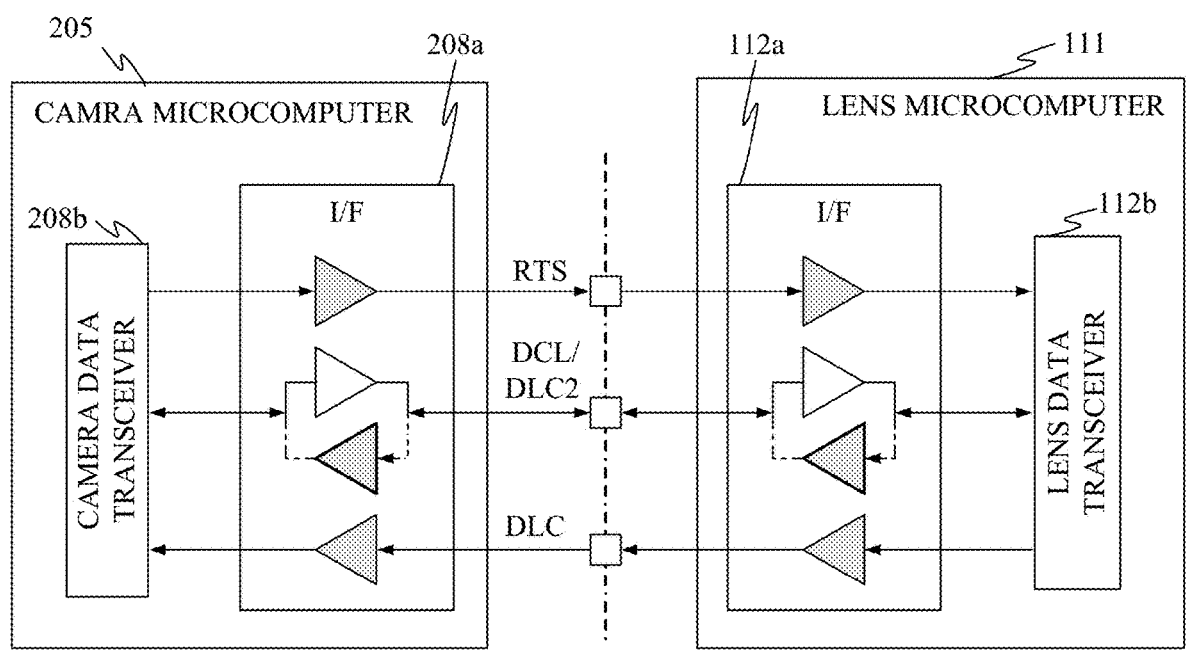
FIG. 6 illustrates a communication circuit between the camera body and the interchangeable lens in a second communication setting in Embodiment 1.

Next, description will be made of the second communication setting between the camera and lens microcomputers 205 and 111. In the second communication setting, as illustrated in FIG. 6, switching communication directions in the communication interface circuits 208a and 112a (that is, switching a communication setting) enables using the second data communication channel for lens data transmission from the lens microcomputer 111 to the camera microcomputer 205. Specifically, in a communication circuit for the second data communication channel, input and output buffers are connected in parallel to the second data communication channel such that an input/output direction in the second data communication channel is switchable. The input and output buffers are exclusively selectable. The input and output buffers connected in parallel to the second data communication channel are hereinafter collectively referred to as "an input/output buffer". In the following description, lens data transmitted from the lens microcomputer 111 to the camera microcomputer 205 through the second data communication channel is referred to as "a second lens data signal DLC2". In addition, the lens data signal DLC transmitted from the lens microcomputer 111 to the camera microcomputer 205 with the transmission of the second lens data signal DLC2 through the first data communication channel is referred to as "a first lens data signal DLC" in order to distinguish this first lens data signal DLC from the second lens data signal DLC2.

The second communication setting uses the first and second data communication channels for continuous communication (burst communication) of the lens data signal to the camera microcomputer 205. This second communication setting enables a large volume data communication at a higher speed as compared with the non-BUSY addition mode in the first communication setting. However, when the first communication setting is switched to the second communication setting, it is necessary to avoid collision of the camera data signal DCL transmitted from the camera microcomputer 205 with the lens data signal DLC2 transmitted from the lens microcomputer 111. Thus, in this embodiment, the camera and lens microcomputers 205 and 111 perform in cooperation with each other a communication setting switching process according to a predetermined procedure.

Figure 7:
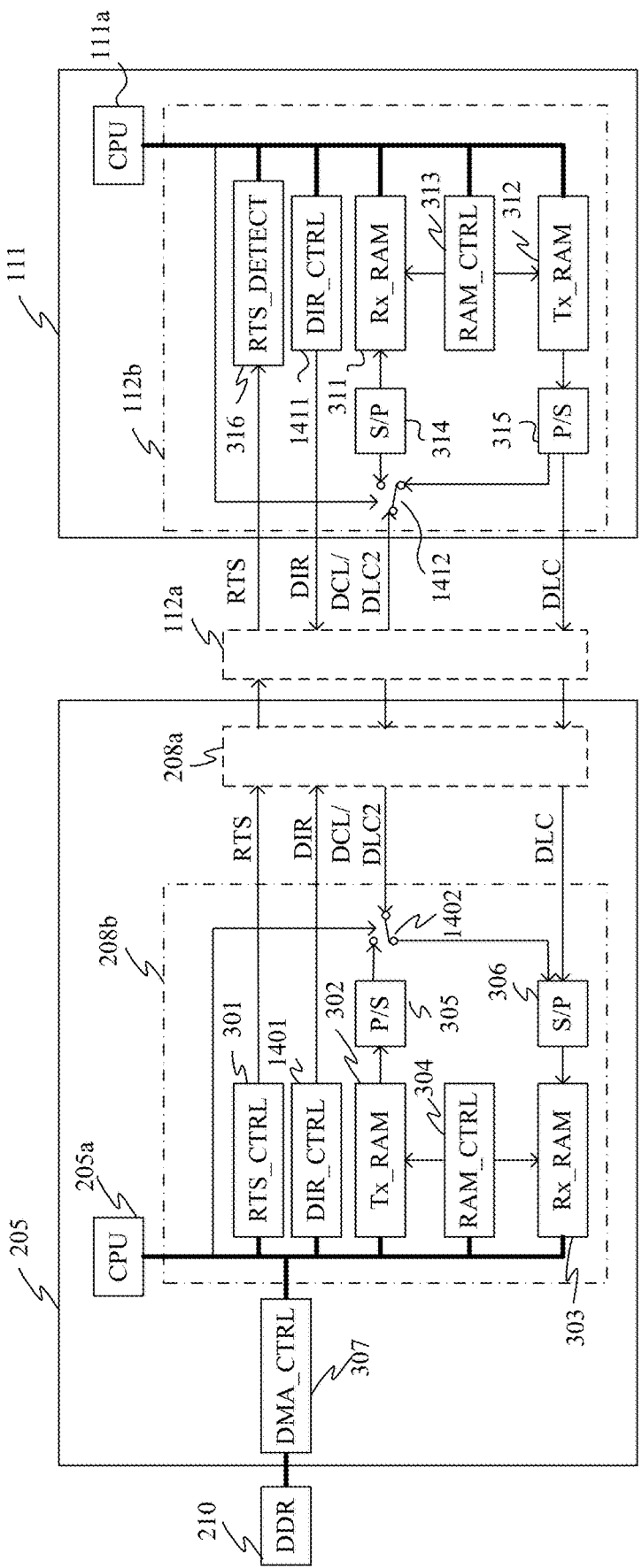
FIG. 7 is a diagram illustrating a configuration of camera and lens data transceivers in a second communication setting in Embodiment 1.

FIG. 7 illustrates a configuration of the camera data transceiver 208b in the camera microcomputer 205 and the lens data transceiver 112b in the lens microcomputer 111. In FIG. 7, constituent elements common to those in FIG. 3 are denoted by the same reference numerals as those in FIG. 3, and their description will be omitted.

The camera data transceiver 208b includes a communication direction switcher 1401 that operates a switch 1402 so as to switch the input/output direction in the second data communication channel to a direction in which the camera microcomputer 205 receives the second lens data signal DLC2 transmitted from the lens microcomputer 111. Then, in the camera microcomputer 205, the second lens data signal DLC2 received from the lens microcomputer 111 through the second data communication channel is converted from a serial data signal into a parallel data signal by the serial-parallel converter 306 and is stored to the receipt data buffer 303. The receipt data buffer 303 also stores the first lens data signal DLC received through the first data communication channel and converted from a serial data signal into a parallel data signal by the parallel-serial converter 306. The second lens data signal DLC2 stored in the receipt data buffer 303 is read out therefrom by the DMA controller 307, and the read lens data signal DLC is transferred and stored to the memory 210.

The lens data transceiver 112b includes a communication direction switcher 1411 that operates a switch 1412 so as to switch the input/output direction in the second data communication channel to the direction in which the lens microcomputer 111 transmits the second lens data signal DLC2 to the camera microcomputer 205. Then, in the lens microcomputer 111, the second lens data signal DLC2 stored in the transmission data buffer 312 is converted from a parallel data signal into a serial data signal by the parallel-serial converter 315 and is transmitted to the camera microcomputer 205 through the second data communication channel. In the lens microcomputer 111, the first lens data signal DLC stored in the transmission data buffer 312 is converted from a parallel data signal into a serial data signal by the parallel-serial converter 315 and is transmitted to the camera microcomputer 205 through the first data communication channel.

Next, description will be made of the procedure in the second communication setting. FIG. 8A illustrates signal waveforms when three frames each one frame is a minimum communication unit are continuously communicated in the second communication setting between the camera and lens microcomputers 205 and 111. In the second communication setting, as the non-BUSY addition mode in the first communication setting, each frame of the first and second lens data signals DLC and DLC2 has a data format formed only by the data frame, that is, not including the BUSY frame.

That is, the first and second lens data signals DLC and DLC2 have a data format not allowing transmitting the BUSY notice from the lens microcomputer 111 to the camera microcomputer 205.

Furthermore, the second communication setting is customized as a communication setting used only for the lens data transmission from the lens microcomputer 111 to the camera microcomputer 205, that is, camera data transmission from the camera microcomputer 205 to the lens microcomputer 111 is unable to be performed in the second communication setting. Moreover, the first and second lens data signals DLC and DLC2 have a data format enabling continuous communication without a wait time between the stop bit SP of a previous frame and the start bit ST of a subsequent frame.

The data frames of the first and second lens data signals DLC and DLC2 have mutually the same data formats in which one frame bit lengths thereof are equal to each other. This is for a purpose of a communication management that makes numbers of the transmitted frames equal to each other in a case where the data communication is stopped in its middle. However, relative relations of bit positions in the data frames of the first and second lens data signals DLC and DLC2 are not necessarily needed to be identical to each other, that is, a shift amount of the bit positions between the first and second lens data signals DLC and DLC2 within one frame length is allowed.

FIG. 8B illustrates signal waveforms when the lens microcomputer 111 continuously transmit n frames in total of the first and second lens data signals DLC and DLC2 to the camera microcomputer 205 in the second communication setting (that is, when performing the burst communication).

The camera microcomputer 205 asserts the request-to-send signal RTS when an event for starting the communication with the lens microcomputer 111 is generated. Thereafter, in the second communication setting in which it is unnecessary to negate the request-to-send signal RTS at each frame, the camera microcomputer 205 maintains the assertion of the request-to-send signal RTS while performing continuous data communication (transmission and receipt) with the lens microcomputer 111.

The lens microcomputer 111 performs, in response to detecting a transmission request by the assertion of the request-to-send signal RTS, a process for producing the first and second lens data signals DLC and DLC2 to be transmitted to the camera microcomputer 205. Then, after a preparation for transmitting the first and second lens data signals DLC and DLC2 is completed, the lens microcomputer 111 starts transmitting a first frame DL1 of the first lens data signal DLC to the camera microcomputer 205 through the first data communication channel. Simultaneously, the lens microcomputer 111 starts transmitting a second frame DL2 of the second lens data signal DLC2 to the camera microcomputer 205 through the second data communication channel.

The lens microcomputer 111 having transmitted the first and second frames DL1 and DL2 of the first and second lens data signals DLC and DLC2 rechecks the request-to-send signal RTS. If the request-to-send signal RTS is asserted, the lens microcomputer 111 transmits, after the first and second frames, third and fourth frames DL3 and DL4 of the first and second lens data signals DLC and DLC2 to the camera microcomputer 205. In this way, while the assertion of the request-to-send signal RTS is maintained by the camera microcomputer 205, the lens microcomputer 111 continuously transmits the n frames in total of the first and second lens data signals DLC and DLC2 to the camera microcomputer 205.

Setting the total frame number n of the first and second lens data signals DLC and DLC2 to an even number makes frame numbers transmitted respectively through the first and second data communication channels from the lens microcomputer 111 to the camera microcomputer 205 equal to each other. Although in FIG. 8B the first lens data signal DLC transmitted through the first data communication channel includes only odd frames and the second lens data signal DLC2 transmitted through the second data communication channel includes only even frames, the first and second lens data signals DLC and DLC2 may include other frames.

FIG. 8C illustrates signal waveforms in a case where, during the continuous data communication from the first and second lens data signal DLC and DLC2 illustrated in FIG. 8B, the camera microcomputer 205 and the lens microcomputer 111 each instruct a suspension of the communication. In response to the assertion of the request-to-send signal RTS by the camera microcomputer 205, the lens microcomputer 111 starts transmitting the first and second lens data signals DLC and DLC2. Thereafter, while frames DL11 and DL12 are being transmitted, the camera microcomputer 205 instructs the suspension of the communication.

In FIG. 8C, T4w1 represents a communication suspension time period where the suspension of the communication is instructed by the camera microcomputer 205. In response to generation of a communication suspension event, the camera microcomputer 205 instructs the lens microcomputer 111 to suspend the communication (that is, provides a communication suspension instruction to the lens microcomputer 111) by temporarily negating the request-to-send signal RTS.

In response to detecting the negation of the request-to-send signal RTS, the lens microcomputer 111 suspends transmitting the first and second lens data signals DLC and DLC2 after completing transmitting the frames DL11 and DL12 incompletely transmitted at the time of detecting the negation (the frames DL11 and DL12 are hereinafter referred to as "suspension frames").

In response to termination of the communication suspension event, the camera microcomputer 205 asserts the request-to-send signal RTS again to instruct the lens microcomputer 111 to restart the communication (that is, provides a communication restart instruction to the lens microcomputer 111). The lens microcomputer 111 restarts, in response to the communication restart instruction, transmitting the first and second lens data signals DLC and DLC2 from frames DL13 and DL14 subsequent to the suspension frames DL11 and DL12 (the subsequent frames DL13 and DL14 are hereinafter referred to as "restart frames").

The lens microcomputer 111 continuously transmits, to the camera microcomputer 205, the restart frames DL13 and DL14, subsequent frames DL15 and DL16 and further subsequent frames DL17 and D118 in this order.

Then, when the transmission of the frames DL17 and DL18 is completed and a communication suspension request event is generated in the lens microcomputer 111, the lens microcomputer 111 notifies the camera microcomputer 205 of a suspension of the communication.

In FIG. 8C, T4w2 represents a communication suspension time period where the suspension of the communication is instructed by the lens microcomputer 111. The notification of the suspension of the communication from the lens microcomputer 111 is performed by not transmitting the first and second lens data signals DLC and DLC2 from the lens microcomputer 111 even though the request-to-send signal RTS is asserted. The camera microcomputer 205 maintains the assertion of the request-to-send signal RTS during the communication suspension time period T4w2 instructed by the lens microcomputer 111. Thereafter, when the communication suspension request event is terminated in the lens microcomputer 111, the lens microcomputer 111 restarts transmitting, to the camera microcomputer 205, the first and second lens data signals DLC and DLC2 from their next restart frames DL19 and DL20. Thus, the lens microcomputer 111 transmits, to the camera microcomputer 205, remaining frames included in the first and second lens data signals DLC and DLC2 and having not been transmitted to the camera microcomputer 205 due to the suspension of the communication.

As described above, in the second communication setting, the lens microcomputer 111 suspends the transmission of the first and second lens data signals DLC and DLC2 to the camera microcomputer 205 and thereby suspends the communication between the camera and lens microcomputers 205 and 111. This function of the lens microcomputer 111 enables performing a large volume data communication at a high speed between the camera and lens microcomputers 205 and 111 while synchronizing them with each other.

As described above, this embodiment enables, in both the first and second communication settings, both the camera and lens microcomputers 205 and 111 to instruct each other to suspend and restart the communication. Therefore, this embodiment enables performing commination control depending on processing loads and capacities of receipt data buffers of the camera and lens microcomputers 205 and 111, which enables smoothly performing a high-speed large volume data communication without making the communication impossible.

Embodiment 2

Next, description will be made of a second embodiment (Embodiment 2) of the present invention. This embodiment forcibly suspends (stops) continuous transmission (burst communication) of the first and second lens data signals DLC and DLC2 from the lens microcomputer 111 to the camera microcomputer 205 in the second communication setting described in Embodiment 1.

As described in Embodiment 1, in the second setting, using first and second data communication channels for transmitting the first and second lens data signals DLC and DLC2 from the lens microcomputer 111 to the camera microcomputer 205 enables a high-speed large volume data communication. However, since the second data communication channel is originally provided for transmission of the camera data signal DCL, using the second data communication channel for transmitting the second lens data signal DLC2 makes it impossible to notify the lens microcomputer 111 of instructions such as control commands from the camera microcomputer 205. Therefore, even when the camera microcomputer 111 recognized a communication abnormality during the burst communication, the camera microcomputer 205 cannot instruct the lens microcomputer 111 to suspend the transmission of the first and second lens data signals DLC and DLC2. The communication abnormality includes data corruption due to static electricity and shut-off of the communication channels between the camera and lens microcomputers 205 and 111 due to user's abrupt detachment of the interchangeable lens 100 from the camera body 200.

When such communication abnormality occurs, it is desirable to forcibly suspend the communication promptly. However, instructing the lens microcomputer 111 to suspend the communication after the burst communication from the lens microcomputer 111 to the camera microcomputer 205 in the second communication setting and then the second data communication channel is switched to the first communication setting for transmitting the camera data signal DCL delays the suspension of the communication. Thus, this embodiment enables promptly forcibly suspension of the communication when the communication abnormality occurs.

Figure 10:
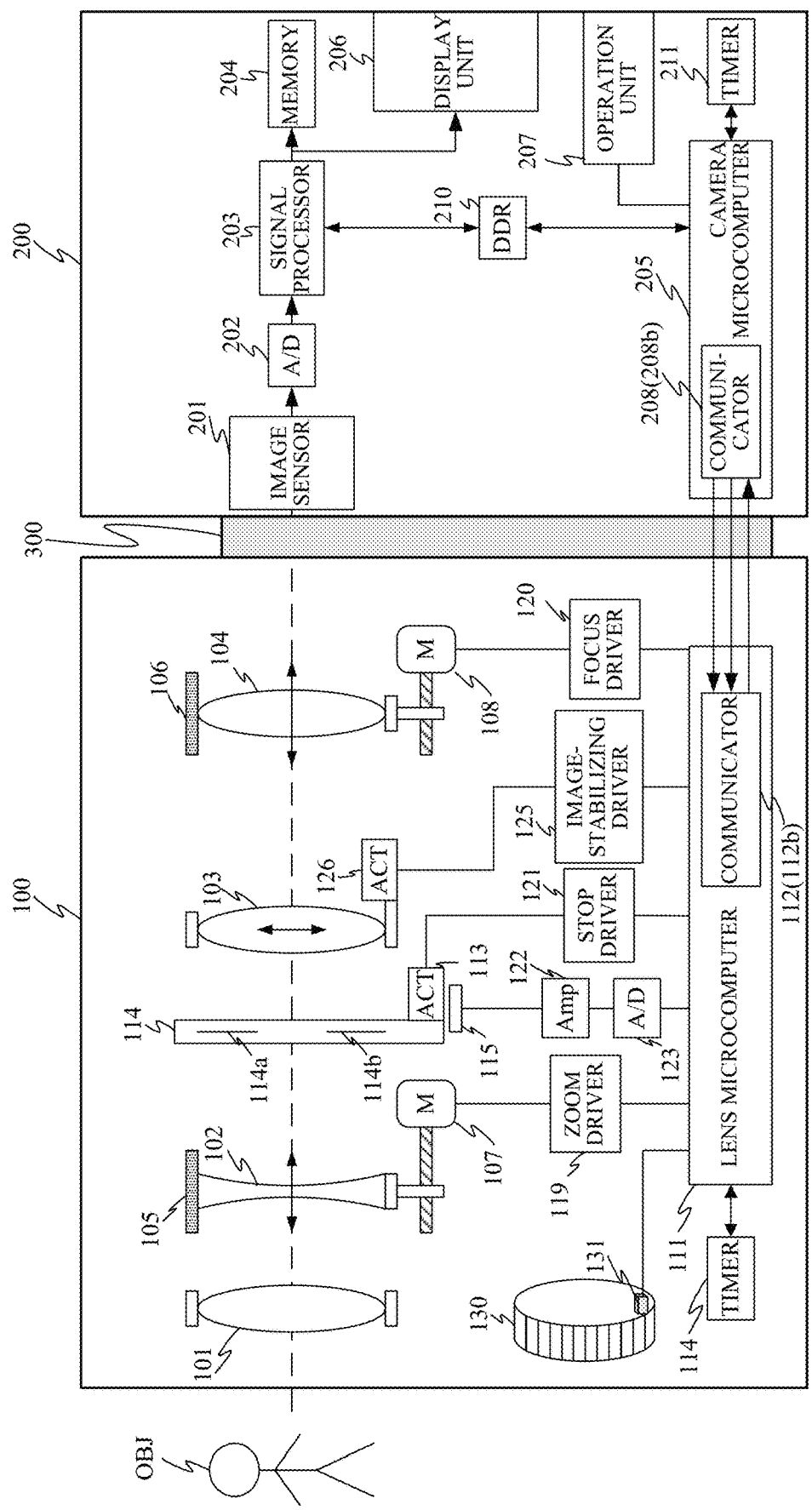
FIG. 10 is a block diagram illustrating a lens-interchangeable camera system that is Embodiment 2 of the present invention.

FIG. 10 illustrates a camera system of this embodiment including a camera system 200' and an interchangeable lens 100'. In the camera system of this embodiment, constituent elements common to those in Embodiment 1 (FIG. 1) are denoted by the same reference numeral as those in Embodiment 1 and description thereof is omitted.

In FIG. 10, the interchangeable lens 100' includes a timer 114 that counts an elapsed time from a time counting start command output from the lens microcomputer 111 to a time counting end command therefrom. The lens microcomputer 111 outputs, in response to a negation of the request-to-send signal RTS by the camera microcomputer 205, the time counting start command to the timer 114. Then, the lens microcomputer 111 outputs, in response to an assertion of the request-to-send signal RTS, the time counting end command to the timer 114. Thereby, the timer 211 provided in the camera body 200' counts the elapsed time, that is, a time for which the request-to-send signal RTS is negated by the camera microcomputer 205 (the time is hereinafter referred to as "a lens RTS negation time"). The lens RTS negation time is input to the lens microcomputer 111.

On the other hand, the camera body 200' includes a timer 211 that counts an elapsed time from a time counting start command output from the camera microcomputer 205 to a time counting end command therefrom. The camera microcomputer 205 negates the request-to-send signal RTS and simultaneously outputs time counting start command to the timer 211. Thereby, the timer 211 counts the elapsed time, that is, a time for which the camera microcomputer 205 negates the request-to-send signal RTS (the time is hereinafter referred to as "a camera RTS negation time"). The camera RTS negation time is input to the camera microcomputer 205.

Figure 11:
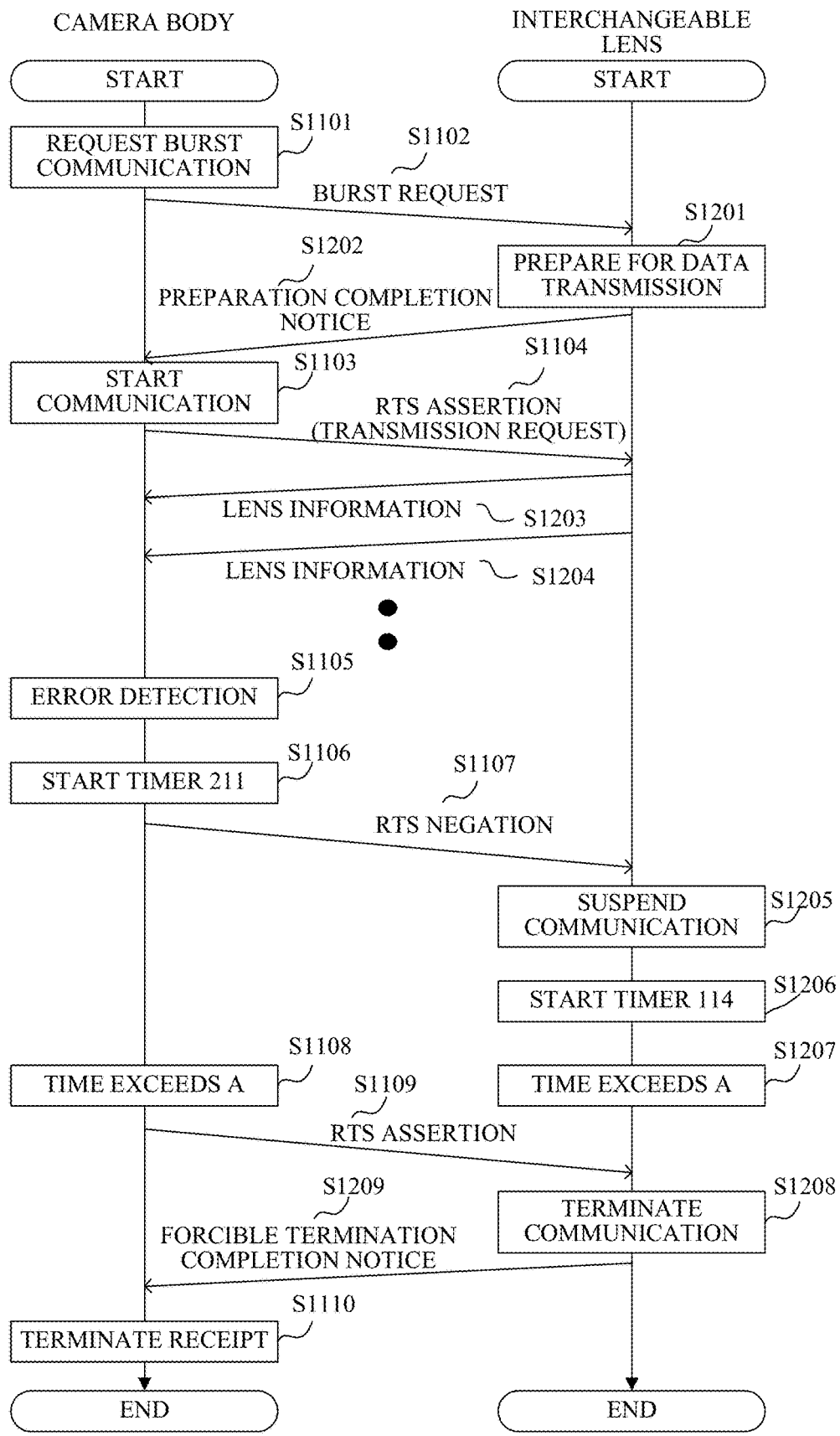
FIG. 11 is a flowchart illustrating a communication process in Embodiment 2.

With reference to a flow chart of FIG. 11, description will be made of a communication control process in this embodiment. The camera microcomputer 205 and the lens microcomputer 111 execute this process according to a communication control program as a computer program. The following description will be made of a case of forcibly suspending the burst communication while the second communication setting described in Embodiment 1 is made. However, the process may be performed for forcibly suspending the communication while the first communication setting is made. The process is started from a state where the first communication setting is made. In FIG. 11 and the following description, "S" represents a step.

At S1101, the camera microcomputer 205 prepares a burst communication request command. The burst communication request command includes information necessary for the lens microcomputer 111 to perform the burst communication, such as a communication data amount and a bit rate in the burst communication. Then, at S1102, the camera microcomputer 111 transmits, as the camera data signal DCL, the burst communication request command to the lens microcomputer 111 through the second data communication channel.

At S1201, the lens microcomputer 111 having received the burst communication request command performs a communication preparation that includes producing the first and second data signals DLC and DLC2 according to the information included in the burst communication request command and switching from the first communication setting to the second communication setting. Then, after the communication preparation is completed, the lens microcomputer 111 at S1202 transmits, as the first camera data signal DLC, a preparation completion notice to the camera microcomputer 205 through the first data communication channel.

The camera microcomputer 205 having received at S1103 the preparation completion notice asserts at S1104, in response to a completion of a communication preparation in the camera microcomputer 205, the request-to-send signal RTS to provide a transmission request to the lens microcomputer 111. The lens microcomputer 111 having received the transmission request starts at S1203 and S1204 a continuous communication (burst communication) of the first and second lens data signals DLC and DLC2 to the camera microcomputer 205 through the first and second communication channels.

During this burst communication, the camera microcomputer 205 always monitors presence and absence of a communication error. The following description will be made of a case where the camera microcomputer 205 detects at S1105 the communication error is detected during receiving the first lens data signal DLC or the second lens data signal DLC2. The communication error can be detected by the presence of an inconsistency between the parity information PA added to each frame as described in FIG. 8A and a parity of the received data. Furthermore, the communication error includes a case where the stop bit SP cannot be correctly detected and a case where the communication becomes impossible due to detachment of the interchangeable lens 100 from the camera body 200.

The camera microcomputer 205 having detected the communication error proceeds to S1106. The camera microcomputer 205 having detected no communication error continues receiving the first and second lens data signals DLC and DLC2.

At S1106, the camera microcomputer 205 provides the time counting start command to the timer 211 to cause the timer 211 to start counting the camera RTS negation time. Then, the camera microcomputer 205 at S1107 negates the request-to-send signal RTS in order to instruct the lens microcomputer 111 to suspend transmitting the first and second lens data signals DLC and DLC2.

The lens microcomputer 111 having detected the negation of the request-to-send signal RTS suspends at S1205 transmitting the first and second lens data signals DLC and DC2. Furthermore, the lens microcomputer 111 at S1206 provides the time counting start command to the timer 114 to cause the timer 114 to start counting the lens RTS negation time.

The lens microcomputer 111 at S1207 determines whether or not the lens RTS negation time counted by the timer 114 exceeds a predetermined time A. The predetermined time A may be preset as a communication standard between the camera and lens microcomputers 205 and 111. Alternatively, the predetermined time A may be provided to the lens microcomputer 111 by the transmission of the burst communication request command from the camera microcomputer 205 to the lens microcomputer 111 at S1102 or by transmission of the camera data signal DCL subsequent thereto. A specific example of the predetermined time A will be described in a next embodiment (Embodiment 3). If the request-to-send signal RTS is asserted by the camera microcomputer 205 before the lens RTS negation time exceeds the predetermined time A, the lens microcomputer 111 restarts transmitting the first and second lens data signals DLC and DLC2.

If at S1108 the camera RTS negation time counted by the timer 211 exceeds the predetermined time A, the camera microcomputer 205 at S1109 asserts the request-to-send signal RTS. The camera microcomputer 205 thereby instructs the lens microcomputer 111 to forcibly terminate the transmission of the first and second lens data signals LC and DLC2. The lens microcomputer 111 detecting the assertion of the request-to-send signal RTS after the lens RTS negation time exceeds the predetermined time A determines that the assertion is an instruction of forcibly terminating the transmission of the first and second lens data signals LC and DLC2. The lens microcomputer 111 at S1208 terminates the transmission of the first and second lens data signals LC and DLC2 in its middle and at S1209 provides a forcible termination completion notice to the camera microcomputer 205 by transmitting a notice command as the first lens data signal DCL.

The camera microcomputer 205 having received the forcible suspension completion notice from the lens microcomputer 111 finishes receiving the first and second lens data signals LC and DLC2 from the lens microcomputer 111 at S1110. Then, the camera microcomputer 205 switches the second data communication channel from a state of allowing receipt of the second lens data signal DLC2 to a state of allowing transmission of the camera data signal DCL.

Figures 12A, 12B:
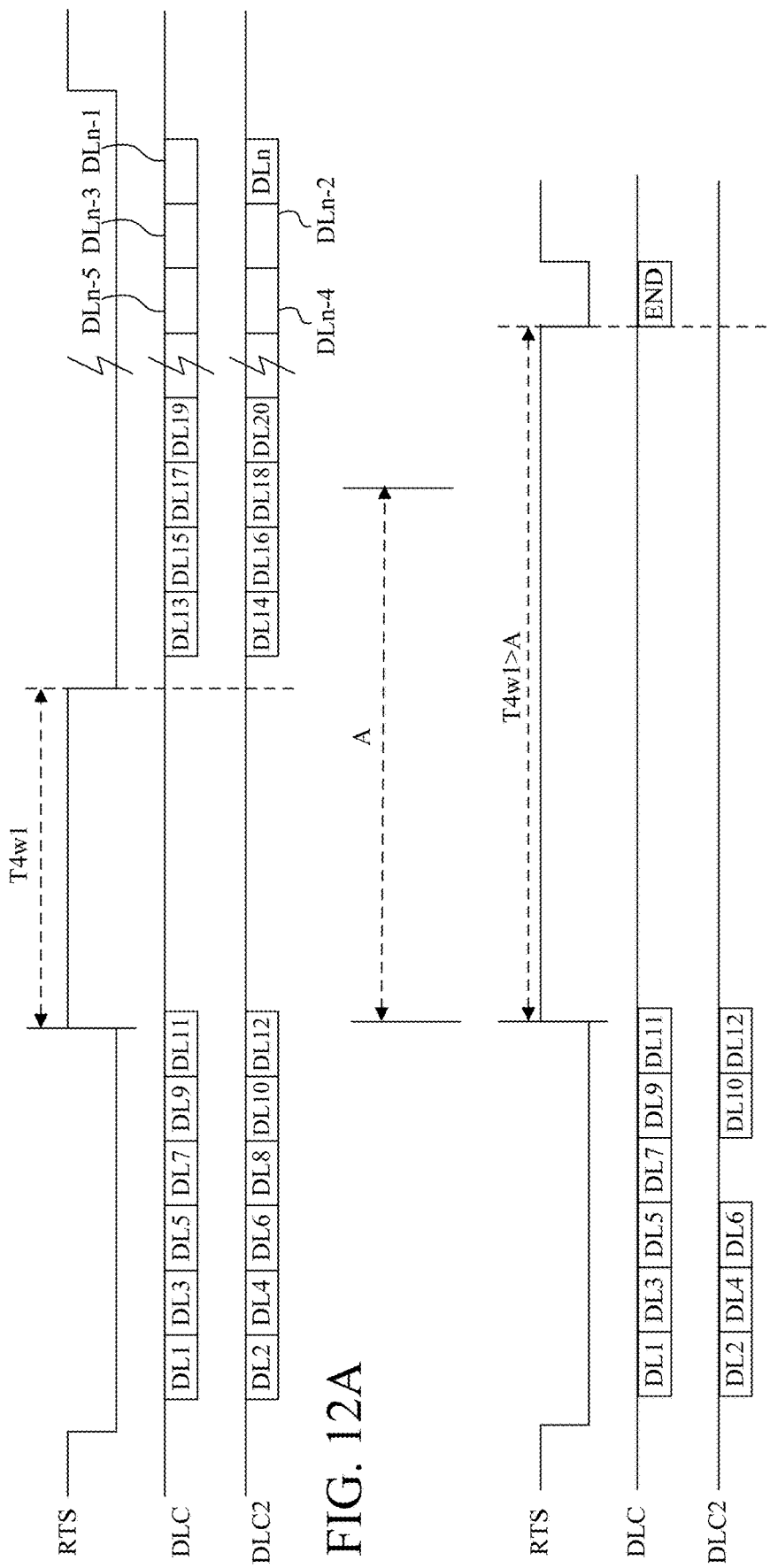
FIGS. 12A and 12B illustrate waveforms of signals transmitted and received between a camera body and an interchangeable lens in Embodiment 2.

FIG. 12A illustrates signal waveforms when, in the second communication setting, n frames (DL1 to DLn) in total of the first and second lens data signals DLC and DLC2 are continuously transmitted from the lens microcomputer 111 to the camera microcomputer 205 with the communication suspension time period $T4w1$ inserted in the middle of the transmission. The lens microcomputer 111 starts, in response to the assertion of the request-to-send signal RTS by the camera microcomputer 205, transmitting the first and second lens data signals DLC and DLC2. Thereafter, during the transmission of the frames DL11 and DL12 from the lens microcomputer 111, the camera microcomputer 205 temporarily negates the request-to-send signal RTS to instruct the lens microcomputer 111 to suspend the communication. In response to detecting the negation of the request-to-send signal RTS, the lens microcomputer 111 completes the transmission of the frames DL11 and DL12 (hereinafter referred to as "suspension frames") of the first and second lens data signals DLC and DLC2, which are frames in the middle of their transmission at the time of the negation, and then suspends the transmission of the first and second lens data signals DLC and DLC2. From this time, the counting of the communication suspension time period $T4w1$, that is, of the camera and lens RTS negation times is started.

When a communication suspension request event is terminated in the camera microcomputer 205 before the communication suspension time period $T4w1$ exceeds the predetermined time A, the camera microcomputer 205 asserts again the request-to-send signal RTS to instruct the lens microcomputer 111 to restart transmitting the first and second lens data signals DLC and DLC2. In response to the instruction, the lens microcomputer 111 restarts transmitting the first and second lens data signals DLC and DLC2 from frames DL13 and DL14 thereof subsequent to the suspension frames DL11 and DL12.

FIG. 12B illustrates waveforms of signals transmitted and received between the camera and lens microcomputers 205 and 111 when the communication suspension time period T4$w$1 described in FI. 12A exceeds the predetermined time A. When the communication suspension time period (camera RTS negation time) T4$w$1 exceeds the predetermined time A, the camera microcomputer 205 asserts the request-to-send signal RTS having been negated until this time to instruct the lens microcomputer 111 to forcibly suspend the communication. When detecting the assertion of the request-to-send signal RTS after the communication suspension time period (lens RTS negation time) T4$w$1 exceeds the predetermined time A, the lens microcomputer 111 determines that the assertion is the instruction of forcibly terminating the communication from the camera microcomputer 205.

In response to this instruction, the lens microcomputer 111 terminates (ends) the transmission of the first and second lens data signals DLC and DLC2 after transmitting the suspension frames DL11 and DL12.

Furthermore, the lens microcomputer 111 notifies the camera microcomputer 205 of the forcible termination completion notice (END). The forcible termination completion notice may be provided in one frame or in multiple frames. The lens microcomputer 111 thus does not transmit remaining frames DL13 to DL$n$ of the first and second lens data signals DLC and DLC2 to the camera microcomputer 205 and clears them.

As described above, in this embodiment, when in the second communication setting the communication error occurs during the burst communication from the lens microcomputer 111, the camera microcomputer 205 can promptly instruct the lens microcomputer 111 to forcibly suspend the burst communication.

Although this embodiment described the case where, when the camera and lens RTS negation times exceed the predetermined time A, the lens microcomputer 111 recognizes that the assertion of the request-to-send signal RTS is merely the instruction of forcibly terminating the burst communication, the lens microcomputer 111 may recognize that the assertion of the request-to-send signal RTS is an instruction of re-performing the burst communication (that is, of forcibly terminating it and restarting from its beginning).

Embodiment 3

Next, description will be made of a third embodiment (Embodiment 3) of the present invention. This embodiment also forcibly suspends the continuous communication (burst communication) of the first and second lens data signals DLC and DLC2 from the lens microcomputer 111 to the camera microcomputer 205 in the second communication setting.

As described with reference to FIG. 7 in Embodiment 1, in the second setting, the first and second lens data signals DLC and DCL2 stored in the receipt data buffer 303 are read out from the receipt data buffer 303 to be transmitted to the memory 210 by the DMA controller 307. This is because the receipt data buffer 303 has an insufficient capacity with respect to the data amount of the entire frames of the first and second lens data signals DLC and DCL2. However, the memory 210 is accessed by not only the camera communicator 208 but also the image processor 203 and others illustrated in FIG. 1, so that accessing competition therebetween causes a wait time and an insufficient processing speed. In this case, providing no instruction for suspending the burst communication from the camera microcomputer 205 to the lens microcomputer 111 results in making the burst communication impossible.

FIG. 13 illustrates an example of the predetermined time A until the lens microcomputer 111 instructs the forcible suspension of the burst communication from the lens microcomputer 111 to the camera microcomputer 205. The predetermined time A is set depending on the data amount of the burst communication. In this example, when the data amount of the burst communication is equal to or smaller than the capacity of the receipt data buffer (Rx_RAM) 303, the predetermined time is set to 0 ms. On the other hand, when the data amount of the burst communication is larger than the capacity of the receipt data buffer (Rx_RAM) 303, the predetermined time A is set to 20 ms. The predetermined time A may be arbitrarily set depending not only on the capacity of the receipt data buffer 303, but also on a processing performance of the camera microcomputer 205. The predetermined time A may be fixed regardless of the capacity of the receipt data buffer 303 and others. In addition, table information indicating the predetermined times A corresponding to various data amounts of the burst communication may be stored in an internal memory in the camera microcomputer 205 or the memory 210. This configuration makes it possible to notify the lens microcomputer 111 of the predetermined time A before the burst communication is started.

Moreover, similar table information may be stored in an internal memory in the lens microcomputer 111 and the lens microcomputer 111 may set the predetermined time A depending on the data amount transmitted in the burst communication from the lens microcomputer 111 to the camera microcomputer 205 before the burst communication is stared. In this case, it is unnecessary that the camera microcomputer 205 notify the lens microcomputer 111 of the predetermined time A.

When the predetermined time A is set to 0 ms, the lens microcomputer 111 determines that the assertion of the request-to-send signal RTS from the negation thereof is not an instruction for restarting the communication, but an instruction for forcibly suspending the communication. On the other hand, when the predetermined time A is set to 20 ms, the lens microcomputer 111 determines that the assertion of the request-to-send signal RTS from the negation thereof within the predetermined time A is an instruction for restarting the communication. However, when the request-to-send signal RTS is asserted from the negation thereof after the predetermined time A elapses, the lens microcomputer 111 determines that the assertion is an instruction for forcibly suspending the communication.

This embodiment can decrease a time required until the burst communication is forcibly suspended in the case where the receipt data buffer 303 has a sufficient capacity with respect to the data amount of the burst communication as compared with Embodiment 2. Thus, during the burst communication in the second communication setting, the camera microcomputer 205 detecting the communication error can promptly instruct the lens microcomputer 111 to forcibly suspend the burst communication. Accordingly, the camera microcomputer 205 enables the lens microcomputer 111 to promptly restart the burst communication.

Embodiment 4

Figure 15:
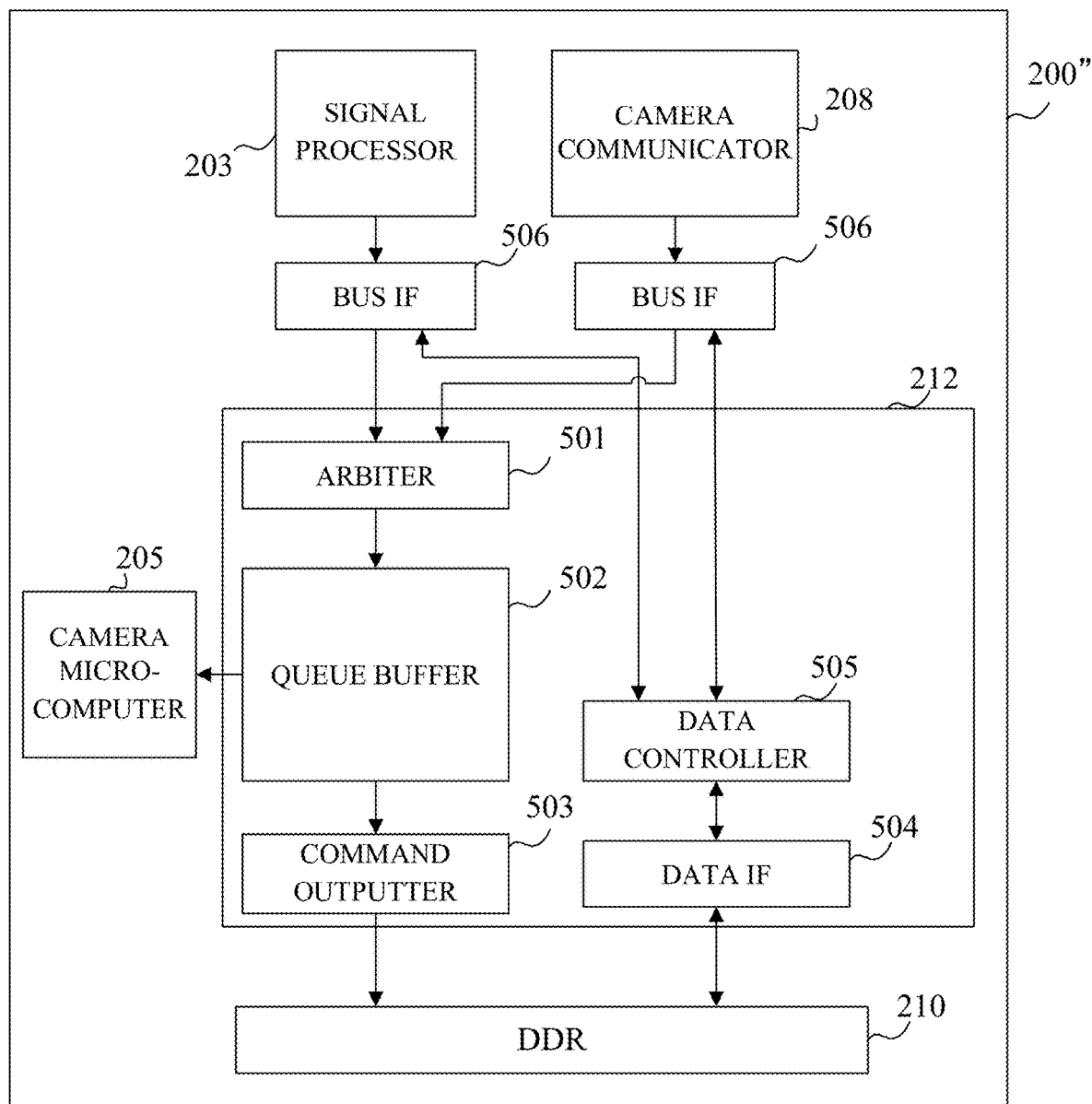
FIG. 15 is a block diagram illustrating a configuration of a memory controller in Embodiment 4.

Next, description will be made of a fourth embodiment (Embodiment 4) of the present invention. In this embodiment, as illustrated in FIG. the 15, a camera body 200" includes a memory controller 212 that controls the memory (DDR) 210. In FIG. 15, the camera communicator 208 included in the camera microcomputer 205 is illustrated outside the camera communicator 208. The camera body 200" in this embodiment corresponds to the camera body 200' further including the memory controller 212, and the interchangeable lens is identical to the interchangeable lens 200'.

Description will be made of the memory controller 212. In FIG. 15, each of bus interfaces (each abbreviated as a bus IF) 506 is a bus interface module having an interface function with a master module that requests memory accesses. The master module is a main processor provided in the camera body 200" and including the camera microcomputer 205, the signal processor 203 and the camera communicator 208. FIG. 15 illustrates a configuration connectable with two identical or different types of buses.

An arbiter 501 performs arbitration and ordering on the memory access requests to the memory 210 received by the bus interfaces 506. A queue buffer 502 is used as a buffer to which the memory access requests subjected to the ordering by the arbiter 501 are temporarily stored. The camera microcomputer 205 acquires information on a frequency of the memory access requests (hereinafter referred to as "memory access frequency") from the memory access requests stored in the queue buffer 502.

A command outputter 503 sequentially takes out the memory access requests stored in the queue buffer 502 and performs accesses to the memory 210 depending on contents of the taken memory access requests. A data interface 504 is an interface for reading out and writing data from and into the memory 210 depending on the memory access request output the command outputter 503.

A data controller 505 takes in, when the memory access request selected by the arbiter 501 is a command that requests data writing to the memory 210, data to be written from the bus interface 506. A data controller 505 stores the data to be written until an actual data writing time and outputs the data to the data interface 504. The data controller 505 further outputs, when the memory access request selected by the arbiter 501 is a command that requests data reading from the memory 210, data read out from the memory 210 to the data interface 504.

Figure 14:
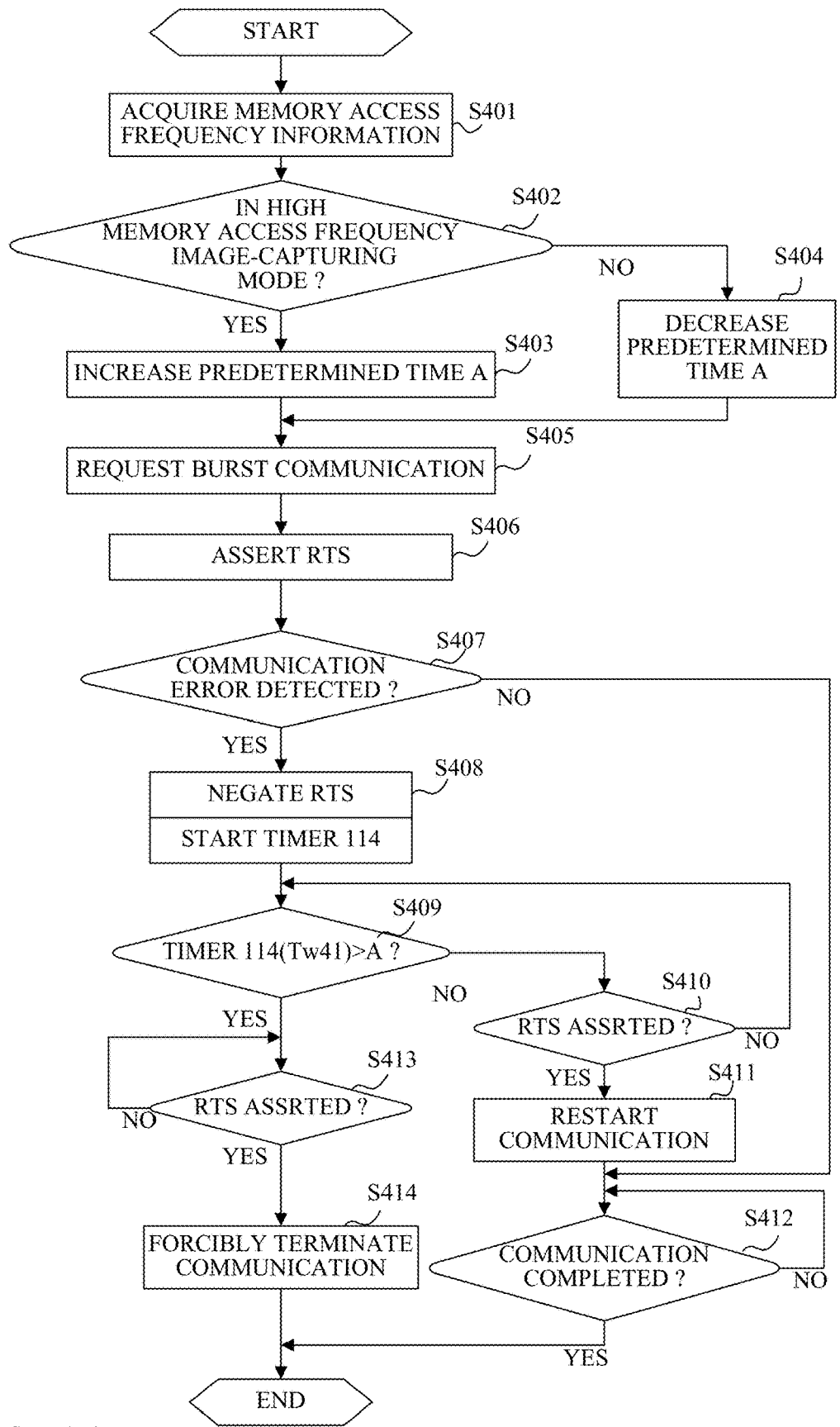
FIG. 14 is a flowchart illustrating a communication process in Embodiment 4 of the present invention.

This embodiment will describe below a forcible suspension of the communication by the camera microcomputer 205 that detects the communication abnormality in the burst communication from the lens microcomputer 111 to the camera microcomputer 205 in the second communication setting in a case where the camera body 200" includes the above-described memory controller 212. FIG. 14 is a flow chart illustrating a communication control process performed by the camera and lens microcomputers 205 and 111. The camera and lens microcomputers 205 and 111 execute this process according to a communication control program as a computer program.

At S401 in FIG. 14, the camera microcomputer 205 acquires the information on the memory access frequency from the memory controller 212 (queue buffer 502). A high memory access frequency means that a memory access request wait time is long. The memory access request wait time is a time period from a time point at which a first memory access request is performed until a time at which the camera communicator 208 becomes a state of being able to receive the burst communication from the lens microcomputer 111 is long.

Next, at S402, the camera microcomputer 205 determines, using the memory access frequency acquired at S401, whether or not an image-capturing mode currently set in the camera body 200" is one in which the memory access frequency of the camera communicator 208 is high (this image-capturing mode is hereinafter referred to as "a high memory access frequency image-capturing mode"). If the current image-capturing mode is the high memory access frequency image-capturing mode, the camera microcomputer 205 proceeds to S403. If the current image-capturing mode is not the high memory access frequency image-capturing mode (that is, a low-memory access frequency image-capturing mode), the camera microcomputer 205 proceeds to S404.

At S403, the camera microcomputer 205 sets, in response to the high memory access frequency, the predetermined time A that is an upper limit of the time (hereinafter referred to as "an RTS negation time") for negating the request-to-send signal RTS to suspend the communication longer than that set at S404 described later. On the other hand, at S404, the camera microcomputer 205 sets, in response to the low memory access frequency, the predetermined time A shorter than that set at S403. That is, the camera microcomputer 205 sets the predetermined time A long when the memory access request wait time is long and sets the predetermined time A short when the memory access request wait time is short.

Next, at S405, the camera microcomputer 205 transmits the burst communication request command as the camera data signal DLC to the lens microcomputer 111 through the second data communication channel. The burst communication request command includes, as described in Embodiment 2, the information necessary for the lens microcomputer 111 to perform the burst communication, such as the communication data amount and the bit rate in the burst communication.

The lens microcomputer 111 having received the burst communication request command performs at S406 a communication preparation that includes producing the first and second data signals DLC and DLC2 according to the information included in the burst communication request command and switching from the first communication setting to the second communication setting. Then, after the communication preparation is completed, the lens microcomputer 111 transmits, as the first camera data signal DLC, a preparation completion notice to the camera microcomputer 205 through the first data communication channel.

The camera microcomputer 205 having received the preparation completion notice asserts at S407, in response to a completion of a communication preparation in the camera microcomputer 205, the request-to-send signal RTS to provide a transmission request to the lens microcomputer 111. The lens microcomputer 111 having received the transmission request starts a continuous communication (burst communication) of the first and second lens data signals DLC and DLC2 to the camera microcomputer 205 through the first and second communication channels.

During this burst communication, the camera microcomputer 205 always monitors presence and absence of the communication error. The detection of the communication error is as described at S1105 in Embodiment 2. When detecting no communication error, the camera microcomputer 205 proceeds to S412.

On the other hand, when detecting the communication error, the camera microcomputer 205 negates at S408 the request-to-send signal RTS to instruct the lens microcomputer 111 to suspend the transmission of the first and second lens data signals DLC and DLC2. The lens microcomputer 111 having detected the negation of the request-to-send signal RTS suspends transmitting the first and second lens data signals DLC and DLC2. Furthermore, the lens microcomputer 111 provides the time counting start command described in Embodiment 2 to the timer 114 to cause the timer 114 to start counting the RTS negation time.

The lens microcomputer 111 at S409 determines whether or not the lens RTS negation time counted by the timer 114 exceeds the predetermined time A. If the RTS negation time does not exceed the predetermined time A, the lens microcomputer 111 proceeds to S410 to determine whether or not the request-to-send signal RTS is asserted again by the camera microcomputer 205. If the request-to-send signal RTS is asserted, the lens microcomputer 111 at S411 restarts the first and second lens data signals DLC and DLC2. Then, at S412, the lens microcomputer 111 determines whether or not the transmission of the whole frames of the first and second lens data signals DLC and DLC2 have been completed. If the transmission has been completed, the lens microcomputer 111 ends this process.

If the request-to-send signal RTS is not asserted at S410, the lens microcomputer 111 returns to S409.

If at S409 the RTS negation time counted by the timer 114 exceeds the predetermined time A, the lens microcomputer 111 proceeds to S413 to determine whether or not the request-to-send signal RTS is asserted again by the camera microcomputer 205. If the request-to-send signal RTS is asserted, the lens microcomputer 111 stops at S414 transmitting the first and second lens data signals DLC and DLC2. That is, the lens microcomputer 111 does not transmit remaining frames of the first and second lens data signals DLC and DLC2 to the camera microcomputer 205 and clears them.

Then, the lens microcomputer 111 provides a forcible termination completion notice to the camera microcomputer 205 by transmitting a notice command as the first lens data signal DCL. The camera microcomputer 205 switches from the second communication setting to the first communication setting and then ends this process.

As described above, when the request-to-send signal RTS is asserted again before the RTS negation time exceeds the predetermined time A, the lens microcomputer 111 determines that the assertion is an instruction of restarting the burst communication and therefore restarts the burst communication having been suspended. On the other hand, when the request-to-send signal RTS is asserted again after the RTS negation time exceeds the predetermined time A, the lens microcomputer 111 determines that the assertion is an instruction of forcibly terminating the burst communication and therefore terminates the burst communication.

Figure 16A:
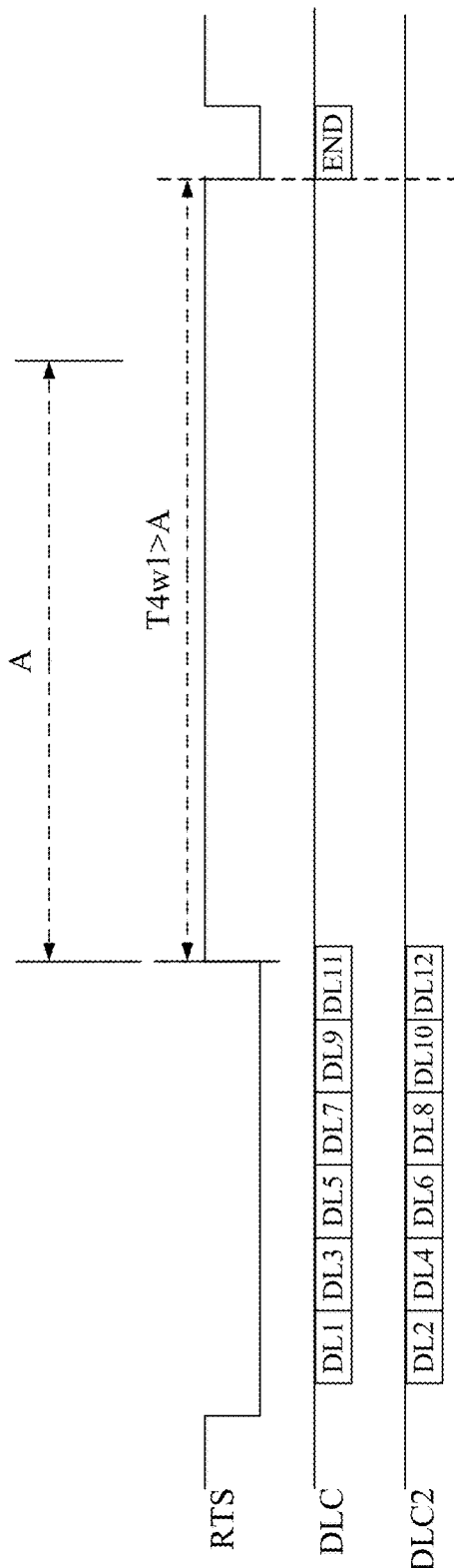
FIGS. 16A and 16B illustrate waveforms of signals transmitted and received between a camera body and an interchangeable lens in Embodiment 4.
Figure 16B:
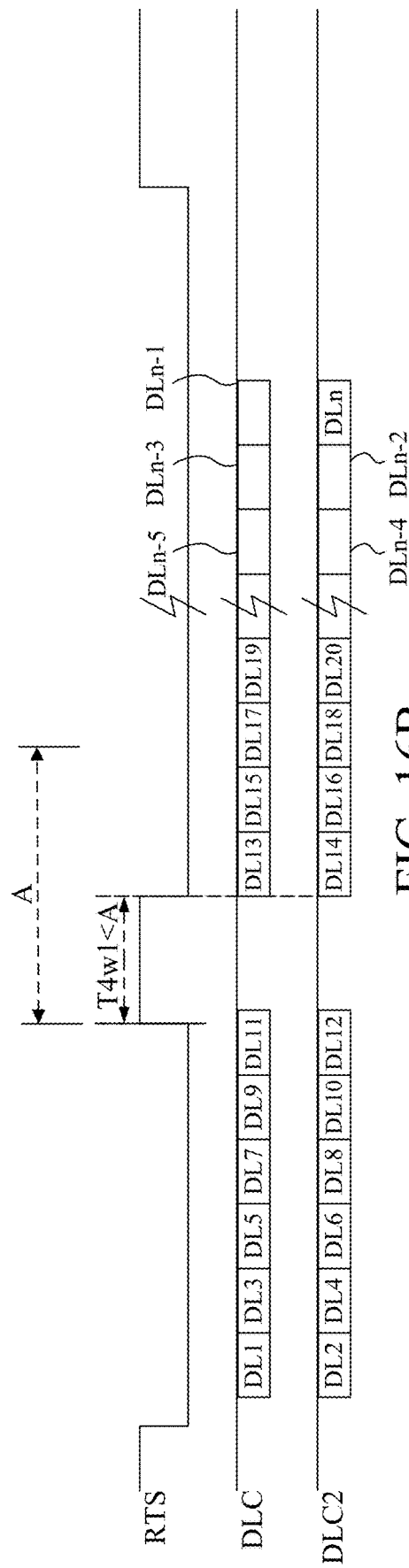

FIGS. 16A and 16B illustrates signal waveforms when, during the continuous transmission of the first and second lens data signals DLC and DLC2 from the lens microcomputer 111 to the camera microcomputer 205, a communication suspension time T4$w$1 as the RTS negate time is inserted. The first and second lens data signals DLC and DLC2 originally include, as illustrated in FIG. 16B, n frames (DL1 to DLn) in total.

In FIGS. 16A and 16B, in response to the assertion of the request-to-send signal RTS by the camera microcomputer 205, the lens microcomputer 111 starts transmitting the first and second lens data signals DLC and DLC2. Thereafter, the camera microcomputer 205 temporarily negates the request-to-send signal RTS during the transmission of the frame DL11 and DL12 from the lens microcomputer 111, thereby instructing the lens microcomputer 111 to suspend the communication. In response to detecting the negation of the request-to-send signal RTS, the lens microcomputer 111 suspends transmitting the first and second lens data signals DLC and DLC2 after completing transmitting the frames DL11 and DL12 incompletely transmitted at the time of detecting the negation (the frames DL11 and DL12 are hereinafter referred to as "suspension frames"). From this time, the counting of the communication suspension time period T4$w$1, that is, of the RTS negation times is started.

FIG. 16A illustrates a case where the image-capturing mode is the high-memory access frequency image-capturing mode and thereby the predetermined time A is set long. On the other hand, FIG. 16B illustrates a case where the image-capturing mode is the low-memory access frequency image-capturing mode and thereby the predetermined time A is set short.

As illustrated in FIG. 16A, when the camera microcomputer 205 asserts the request-to-send signal RTS again after the communication suspension time period T4$w$1 exceeds the predetermined time A, the lens microcomputer 111 determines that the assertion is the instruction of forcibly terminating the communication. In response to this instruction, the lens microcomputer 111 terminates (ends) the transmission of the first and second lens data signals DLC and DLC2 after transmitting the suspension frames DL11 and DL12. Furthermore, the lens microcomputer 111 notifies the camera microcomputer 205 of the forcible termination completion notice (END). The forcible termination completion notice may be provided in one frame or in multiple frames. Thus, the lens microcomputer 111 does not transmit remaining frames DL13 to DLn of the first and second lens data signals DLC and DLC2 to the camera microcomputer 205 and clears them.

On the other hand, as illustrated in FIG. 16B, when the request-to-send signal RTS is asserted again by the camera microcomputer 205 before the communication suspension time period T4$w$1 exceeds the predetermined time A, the lens microcomputer 111 determines that the assertion is an instruction of restarting transmitting the communication. In response to the instruction, the lens microcomputer 111 restarts transmitting the first and second lens data signals DLC and DLC2 from restart frames DL13 and DL14 subsequent to the suspension frames DL11 and DL12.

As described above, this embodiment variably sets the predetermined time A as the upper limit time depending on difference in memory access wait time due to difference in memory access frequency to the memory 210 that finally stores the first and second lens data signals DLC and DLC2. Thus, this embodiment enables setting an optimum upper limit time as the communication suspension time for a storing speed at which the first and second lens data signals DLC and DLC2 of are stored to the memory 210. Accordingly, after the suspension of the communication in response to detecting the communication error in the camera body 200", the lens microcomputer 111 can promptly determine whether to forcibly terminate or restart the communication.

Although this embodiment described the case where, when the RTS negation time exceeds the predetermined time A, the lens microcomputer 111 recognizes that the assertion of the request-to-send signal RTS is merely the instruction of forcibly terminating the burst communication, the lens microcomputer 111 may recognize that the assertion of the request-to-send signal RTS is an instruction of re-performing the burst communication (that is, of forcibly terminating it and restarting from its beginning). Furthermore, when the RTS negation time is likely to exceed the predetermined time A, a priority of an access request from the camera microcomputer 205 (camera communicator 208) to the memory 210 may be controlled to be increased such that the burst communication from the lens microcomputer 111 is completed within the predetermined time A.

Each of the above-described embodiments allows the accessory apparatus and the image-capturing apparatus to suspend or terminate data transmission from each other, which enables a smooth and high-speed large volume data communication between the accessory apparatus and the image-capturing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^h$), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-073360, filed on Mar. 31, 2016, which is hereby incorporated by reference herein in its entirety.

What is claimed is:

1. An accessory apparatus detachably attachable to an image-capturing apparatus, the accessory apparatus comprising:
   at least one processor or circuit configured to perform operations of the following units:
   an accessory control unit configured to control a communication between the accessory apparatus and the image-capturing apparatus,
   wherein the accessory control unit performs, in a first mode, the communication with the image-capturing apparatus via a second channel and a third channel in accordance with a maintenance of a signal level of a first channel at a second signal level after a change of the signal level of the first channel from a first signal level to the second signal level, and
   wherein the accessory control unit stops a transmission of accessory data in accordance with a change of the signal level of the first channel from the second signal level to the first signal level.

2. The accessory apparatus according to claim 1, wherein the accessory control unit, when the signal level of the first channel changes from the second signal level to the first signal level at a time when a transmission of a frame of accessory data is incomplete, stops the transmission of the accessory data after the transmission of the frame of the frame of accessory data is completed.

3. The accessory apparatus according to claim 1, wherein the accessory control unit performs a transmission of accessory data via the second channel and a reception of camera data via the third channel as the communication performed in accordance with the maintenance of the signal level of the first channel at the second signal level.

4. The accessory apparatus according to claim 3, wherein the accessory control unit, in a case where the signal level of the first channel is maintained at the second signal level, stops the reception of the camera data via the third channel in response to a stop of the transmission of the accessory data via the second channel.

5. The accessory apparatus according to claim 1, wherein the accessory control unit performs a transmission of accessory data via the second and third channels as the communication performed in accordance with the maintenance of the signal level of the first channel at the second signal level.

6. The accessory apparatus according to claim 5, wherein the accessory control unit performs a force-quit of the transmission of the accessory data via the second and third channels in accordance with a course of a predetermined time after the change of the signal level of the first channel from the second signal level to the first signal level.

7. The image-capturing apparatus according to claim 1, wherein the image-capturing apparatus control unit performs a reception of accessory data via the second and third channels as the communication performed in accordance with the maintenance of the signal level of the first channel at the second signal level.

8. The image-capturing apparatus according to claim 7, wherein the image-capturing apparatus control unit, in a case where the signal level of the first channel changes from the second signal level to the first signal level, stop the reception of the accessory data.

9. The image-capturing apparatus according to claim 8, wherein the camera control unit performs a force-quit of the reception of the accessory data via the second and third channels in accordance with a course of a predetermined time after the change of the signal level of the first channel from the second signal level to the first signal level.

10. The accessory apparatus according to claim 1, wherein the accessory control unit transmits information indicating data size of accessory data, and
    wherein the accessory control unit transmits the accessory data in the first mode, data size of which is indicated by the information.

11. The accessory apparatus according to claim 10, wherein the accessory control unit transmits the information indicating data size of accessory data in a second mode, and
    wherein the accessory control unit performs, in the second mode, the communication with the image-capturing apparatus via the second channel and the third channel in accordance with a change of the signal level of the first channel from the first signal level to the second signal level.

12. The accessory apparatus according to claim 11, wherein the information indicating data size of accessory data indicates, as the data size, number of frames to be transmitted.

13. The accessory apparatus according claim 10, wherein the accessory control unit, in the first mode, stops a transmission of accessory data in accordance with a change of the signal level of the first channel from the second signal level to the first signal level in a case where transmission of accessory data of the data size indicated by the information is incomplete, and resumes the transmission in accordance with a change of the signal level of the first channel from the first signal level to the second signal level after the stop of transmission.

14. The accessory apparatus according to claim 1, wherein the accessory control unit performs, in a second mode, the communication with the image-capturing apparatus via the second channel and the third channel in accordance with a change of the signal level of the first channel from the first signal level to the second signal level.

15. The accessory apparatus according to claim 1, wherein the accessory apparatus is a lens apparatus.

16. The accessory apparatus according to claim 1, wherein the accessory control unit transmits information indicating data size of accessory data,
wherein the accessory control unit, when the signal level of the first channel changes from the second signal level to the first signal level at a time when a transmission of a frame of accessory data is incomplete, stops the transmission of the accessory data after the transmission of the frame of accessory data is completed, even if data size of transmitted accessory data is less than the data size indicated by the information.

17. The accessory apparatus according to claim 1, wherein the accessory control unit performs control so that
the accessory data is transmitted via the second channel in accordance with the maintenance of the signal level of the first channel at the second signal level after the change of the signal level of the first channel from the first signal level to the second signal level, and
the camera data, which is transmitted by the image-capturing apparatus in response to the transmission of the accessory data via the second channel, is received via the third channel in accordance with the maintenance of the signal level of the first channel at the second signal level after the change of the signal level of the first channel from the first signal level to the second signal level.

18. An image-capturing apparatus to which an accessory apparatus is detachably attachable, the image-capturing apparatus comprising:
at least one processor or circuit configured to perform operations of the following units:
an image-capturing apparatus control unit configured to control a communication between the accessory apparatus and the image-capturing apparatus,
wherein the image-capturing apparatus control unit performs, in a first mode, the communication with the accessory apparatus via a second channel and a third channel in accordance with a maintenance of a signal level of a first channel at a second signal level after a change of the signal level of the first channel from a first signal level to the second signal level, and
wherein the image-capturing apparatus control unit stops a reception of accessory data in accordance with a change of the signal level of the first channel from the second signal level to the first signal level.

19. The image-capturing apparatus according to claim 18, wherein the image-capturing apparatus control unit, when the signal level of the first channel changes from the second signal level to the first signal level at a time when a reception of a frame of accessory data is incomplete, stops the reception of the accessory data after the reception of the frame of accessory data is completed.

20. The image-capturing apparatus according to claim 18, wherein the image-capturing apparatus control unit performs a reception of accessory data via the second channel and a transmission of camera data via the third channel as the communication performed in accordance with the maintenance of the signal level of the first channel at the second signal level.

21. The image-capturing apparatus according to claim 20, wherein the image-capturing apparatus control unit, in a case where the signal level of the first channel is maintained at the second signal level, stops the transmission of the camera data via the third channel in response to a stop of the reception of the accessory data via the second channel.

22. The image-capturing apparatus according to claim 18, wherein the image-capturing apparatus control unit receives information indicating data size of accessory data, and
wherein the image-capturing apparatus control unit receives the accessory data in the first mode, data size of which is indicated by the information.

23. The image-capturing apparatus according to claim 22, wherein the image-capturing apparatus control unit receives the information indicating data size of accessory data in a second mode, and
wherein the image-capturing apparatus control unit performs, in the second mode, the communication with the accessory apparatus via the second channel and the third channel in accordance with a change of the signal level of the first channel from the first signal level to the second signal level.

24. The image-capturing apparatus according to claim 23, wherein the information indicating data size of accessory data indicates, as the data size, number of frames to be received.

25. The image-capturing apparatus according claim 22, wherein the image-capturing apparatus control unit, in the first mode, stops a reception of accessory data in accordance with a change of the signal level of the first channel from the second signal level to the first signal level in a case where reception of accessory data of the data size indicated by the information is incomplete, and resumes the reception in accordance with a change of the signal level of the first channel from the first signal level to the second signal level after the stop of reception.

26. The image-capturing apparatus according to claim 18, wherein the image-capturing apparatus control unit performs, in a second mode, the communication with the accessory apparatus via the second channel and the third channel in accordance with a change of the signal level of the first channel from the first signal level to the second signal level.

27. The image-capturing apparatus according to claim 18, wherein the accessory apparatus is a lens apparatus.

28. The image-capturing apparatus according to claim 18, wherein the image-capturing apparatus control unit receives information indicating data size of accessory data,
wherein the image-capturing apparatus control unit, when the signal level of the first channel changes from the second signal level to the first signal level at a time when a reception of a frame of accessory data is incomplete, stops the reception of the accessory data after the reception of the frame of accessory data is completed, even if data size of received accessory data is less than the data size indicated by the information.

29. The image-capturing apparatus according to claim 18, wherein the image-capturing apparatus control unit performs control so that the accessory data is received via the second channel in accordance with the maintenance of the signal level of the first channel at the second signal level after the change of the signal level of the first channel from the first signal level to the second signal level, and the camera data, which is transmitted in response to the reception of the accessory data via the second channel, is transmitted via the third channel in accordance with the maintenance of the signal level of the first channel at the second signal level after the change of the signal level of the first channel from the first signal level to the second signal level.

30. A control method for an accessory apparatus detachably attachable to an image-capturing apparatus and controlling a communication between the accessory apparatus and the image-capturing apparatus, the method comprising the step of:

performing, in a first mode, the communication with the image-capturing apparatus via a second channel and a third channel in accordance with a maintenance of a signal level of a first channel at a second signal level after a change of the signal level of the first channel from a first signal level to the second signal level; and stopping a transmission of accessory data in accordance with a change of the signal level of the first channel from the second signal level to the first signal level.

31. A control method for an image-capturing apparatus to which an accessory apparatus is detachably attachable and controlling a communication between the image-capturing apparatus and the accessory apparatus, the method comprising the steps of:

performing, in a first mode, the communication with the accessory apparatus via a second channel and a third channel in accordance with a maintenance of a signal level of a first channel at a second signal level after a change of the signal level of the first channel from a first signal level to the second signal level, and stopping a reception of accessory data in accordance with a change of the signal level of the first channel from the second signal level to the first signal level.

32. A non-transitory storage medium storing a control program as a computer program for causing a computer to execute a control method for an accessory apparatus detachably attachable to an image-capturing apparatus and controlling a communication between the accessory apparatus and the image-capturing apparatus, the method comprising the step of:

performing, in a first mode, the communication with the image-capturing apparatus via a second channel and a third channel in accordance with a maintenance of a signal level of a first channel at a second signal level after a change of the signal level of the first channel from a first signal level to the second signal level; and stopping a transmission of accessory data in accordance with a change of the signal level of the first channel from the second signal level to the first signal level.

33. A non-transitory storage medium storing a control program as a computer program for causing a computer to execute a control method for an image-capturing apparatus to which an accessory apparatus is detachably attachable and controlling a communication between the image-capturing apparatus and the accessory apparatus, the method comprising the steps of:

performing, in a first mode, the communication with the accessory apparatus via a second channel and a third channel in accordance with a maintenance of a signal level of a first channel at a second signal level after a change of the signal level of the first channel from a first signal level to the second signal level, and stopping a reception of accessory data in accordance with a change of the signal level of the first channel from the second signal level to the first signal level.

* * * * *